US00RE41118E

(19) United States
(12) Reissued Patent
Brezinski et al.

(10) Patent Number: US RE41,118 E
(45) Date of Reissued Patent: Feb. 16, 2010

(54) ANNULAR ISOLATORS FOR EXPANDABLE TUBULARS IN WELLBORES

(75) Inventors: Michael M. Brezinski, Duncan, OK (US); Gregory B. Chitwood, Dallas, TX (US); Ralph H. Echols, Dallas, TX (US); Gary P. Funkhouser, Duncan, OK (US); John C. Gano, Carrollton, TX (US); William D. Henderson, Tioga, TX (US); Paul I. Herman, Plano, TX (US); Marion D. Kilgore, Dallas, TX (US); Ronald J. Powell, Duncan, OK (US); Thomas W. Ray, Plano, TX (US); Roger L. Schultz, Aubrey, TX (US); Robert S. Taylor, Red Deer (CA); Bradley L. Todd, Duncan, OK (US); Cynthia Tuckness, Coppell, TX (US)

(73) Assignee: Halliburton Energy Services, Inc., Houston, TX (US)

(21) Appl. No.: 11/928,732

(22) Filed: Oct. 30, 2007

Related U.S. Patent Documents

Reissue of:
(64) Patent No.: 6,854,522
Issued: Feb. 15, 2005
Appl. No.: 10/252,621
Filed: Sep. 23, 2002

(51) Int. Cl.
*E21B 33/127* (2006.01)
*E21B 23/00* (2006.01)

(52) U.S. Cl. ..... 166/387; 166/187; 166/206; 166/382; 277/333

(58) Field of Classification Search ..... 166/380, 166/382, 387, 206, 207, 187; 277/333
See application file for complete search history.

(56) References Cited

U.S. PATENT DOCUMENTS 266,848 A 10/1882 Lewis
1,336,738 A 4/1920 Fletcher (Continued)

FOREIGN PATENT DOCUMENTS

EP 1223305 A2 7/2002

(Continued)

OTHER PUBLICATIONS

Halliburton, Anjel, Conformance Technology Manual, Chapter 4, Polymer Treatment, Aug. 1995, pp. 4–34–4–35.*
Halliburton, Energy Services, "Matrol and Matrol II Service Complexed Polymer Barrier For Use in Producing And Injection Wells," May 1993.*

(Continued)

*Primary Examiner*—Hoang Dang

(57) ABSTRACT

The present disclosure addressed apparatus and methods for forming an annular isolator in a borehole after installation of production tubing. Annular seal means are carried in or on production tubing as it is run into a borehole. In conjunction with expansion of the tubing, the seal is deployed to form an annular isolator. An inflatable element carried on the tubing may be inflated with a fluid carried in the tubing and forced into the inflatable element during expansion of the tubing. Reactive chemicals may be carried in the tubing and injected into the annulus to react with each other and ambient fluids to increase in volume and harden into an annular seal. An elastomeric sleeve, ring or band carried on the tubing may be expanded into contact with a borehole wall and may have its radial dimension increased in conjunction with tubing expansion to form an annular isolator.

47 Claims, 16 Drawing Sheets

U.S. PATENT DOCUMENTS

| | | | | | |
|---|---|---|---|---|---|
| 1,842,033 | A | | 1/1932 | Lewis | |
| 1,979,802 | A | | 11/1934 | Kinley | |
| 2,144,026 | A | | 1/1939 | Park | |
| 2,187,480 | A | | 1/1940 | Baker | |
| 2,214,226 | A | * | 9/1940 | English | 166/277 |
| 2,356,947 | A | | 8/1944 | Pranger et al. | |
| 2,646,845 | A | | 7/1953 | Schillinger | |
| 2,738,017 | A | | 3/1956 | Lynes | |
| 2,742,968 | A | | 4/1956 | Hildebrandt | |
| 2,812,025 | A | | 11/1957 | Teague et al. | |
| 2,845,130 | A | * | 7/1958 | Austin | 277/333 |
| 2,849,070 | A | | 8/1958 | Maly | |
| 2,945,541 | A | | 7/1960 | Maly et al. | |
| 2,986,217 | A | | 5/1961 | Johnston | |
| 3,067,819 | A | | 12/1962 | Gore | |
| 3,097,696 | A | | 7/1963 | Orr | |
| 3,099,318 | A | * | 7/1963 | Miller et al. | 166/227 |
| 3,119,451 | A | | 1/1964 | Hall | |
| 3,203,451 | A | * | 8/1965 | Vincent | 138/143 |
| 3,235,017 | A | | 2/1966 | Lynes | |
| 3,272,517 | A | | 9/1966 | Howard et al. | |
| 3,380,534 | A | | 4/1968 | Hall et al. | |
| 3,385,367 | A | | 5/1968 | Kollsman | |
| 3,419,080 | A | | 12/1968 | Lebourg | |
| 3,477,506 | A | * | 11/1969 | Malone | 166/207 |
| 3,575,237 | A | | 4/1971 | Malone | |
| 3,581,816 | A | | 6/1971 | Malone | |
| 3,784,214 | A | | 1/1974 | Tamplen | |
| 3,842,912 | A | | 10/1974 | Lindsey, Jr. | |
| 3,918,523 | A | | 11/1975 | Stuber | |
| 3,955,625 | A | | 5/1976 | Hughes et al. | |
| 4,137,970 | A | | 2/1979 | Laflin et al. | |
| 4,155,404 | A | | 5/1979 | Hollingsworth | |
| 4,230,180 | A | | 10/1980 | Patton et al. | |
| RE30,711 | E | | 8/1981 | Suman, Jr. | |
| 4,349,204 | A | | 9/1982 | Malone | |
| 4,424,861 | A | | 1/1984 | Carter, Jr. et al. | |
| 4,440,226 | A | | 4/1984 | Suman, Jr. | |
| 4,484,626 | A | * | 11/1984 | Kerfoot et al. | 166/191 |
| 4,498,536 | A | * | 2/1985 | Ross et al. | 166/250.01 |
| 4,499,947 | A | | 2/1985 | Zsoka et al. | |
| 4,528,104 | A | | 7/1985 | House et al. | |
| 4,614,346 | A | | 9/1986 | Ito | |
| 4,629,991 | A | * | 12/1986 | Wheeler | 324/232 |
| 4,651,818 | A | | 3/1987 | Johnson et al. | |
| 4,655,286 | A | | 4/1987 | Wood | |
| 4,714,117 | A | | 12/1987 | Dech | |
| 4,715,442 | A | * | 12/1987 | Kahil et al. | 166/250.01 |
| 4,892,144 | A | | 1/1990 | Coone | |
| 4,913,232 | A | | 4/1990 | Cheymol et al. | |
| 4,919,989 | A | | 4/1990 | Colangelo | |
| 4,936,386 | A | | 6/1990 | Colangelo | |
| 5,027,894 | A | * | 7/1991 | Coone et al. | 166/122 |
| 5,048,605 | A | | 9/1991 | Toon et al. | |
| 5,083,608 | A | * | 1/1992 | Abdrakhmanov et al. | 166/55 |
| 5,095,991 | A | | 3/1992 | Milberger | |
| 5,101,908 | A | | 4/1992 | Mody | |
| 5,195,583 | A | | 3/1993 | Toon et al. | |
| 5,327,962 | A | | 7/1994 | Head | |
| 5,337,823 | A | * | 8/1994 | Nobileau | 166/277 |
| 5,366,012 | A | * | 11/1994 | Lohbeck | 166/277 |
| 5,392,850 | A | | 2/1995 | Cornette et al. | |
| 5,398,998 | A | | 3/1995 | Evans | |
| 5,664,628 | A | * | 9/1997 | Koehler et al. | 166/369 |
| 5,678,635 | A | | 10/1997 | Dunlap et al. | |
| 5,709,269 | A | | 1/1998 | Head | |
| 5,718,288 | A | * | 2/1998 | Bertet et al. | 166/287 |
| 5,810,085 | A | | 9/1998 | James et al. | |
| 5,833,001 | A | * | 11/1998 | Song et al. | 166/287 |
| 5,875,845 | A | * | 3/1999 | Chatterji et al. | 166/293 |
| 5,901,789 | A | * | 5/1999 | Donnelly et al. | 166/381 |
| 5,964,288 | A | * | 10/1999 | Leighton et al. | 166/207 |
| 6,012,522 | A | * | 1/2000 | Donnelly et al. | 166/276 |
| 6,026,899 | A | | 2/2000 | Arizmendi et al. | |
| 6,044,906 | A | * | 4/2000 | Saltel | 166/187 |
| 6,135,208 | A | * | 10/2000 | Gano et al. | 166/313 |
| 6,173,788 | B1 | | 1/2001 | Lembcke et al. | |
| 6,263,972 | B1 | * | 7/2001 | Richard et al. | 166/381 |
| 6,302,214 | B1 | | 10/2001 | Carmichael et al. | |
| 6,328,113 | B1 | * | 12/2001 | Cook | 166/387 |
| 6,412,565 | B1 | * | 7/2002 | Castano-Mears | 166/381 |
| 6,415,509 | B1 | * | 7/2002 | Echols et al. | 29/896.62 |
| 6,431,282 | B1 | * | 8/2002 | Bosma et al. | 166/288 |
| 6,446,717 | B1 | * | 9/2002 | White et al. | 166/187 |
| 6,450,261 | B1 | * | 9/2002 | Baugh | 166/277 |
| 6,454,001 | B1 | | 9/2002 | Thompson et al. | |
| 6,457,518 | B1 | | 10/2002 | Castano-Mears et al. | |
| 6,457,533 | B1 | * | 10/2002 | Metcalfe | 166/381 |
| 6,505,685 | B1 | | 1/2003 | Sullaway et al. | |
| 6,530,574 | B1 | * | 3/2003 | Bailey et al. | 277/314 |
| 6,543,545 | B1 | * | 4/2003 | Chatterji et al. | 166/381 |
| 6,554,070 | B2 | | 4/2003 | Gendet et al. | |
| 6,581,682 | B1 | * | 6/2003 | Parent et al. | 166/180 |
| 6,626,240 | B1 | | 9/2003 | Sunde | |
| 6,634,431 | B2 | * | 10/2003 | Cook et al. | 166/387 |
| 6,695,067 | B2 | * | 2/2004 | Johnson et al. | 166/387 |
| 6,712,154 | B2 | | 3/2004 | Cook et al. | |
| 6,719,064 | B2 | | 4/2004 | Price-Smith et al. | |
| 6,722,433 | B2 | * | 4/2004 | Brothers et al. | 166/288 |
| 6,745,845 | B2 | | 6/2004 | Cook et al. | |
| 6,779,601 | B2 | | 8/2004 | Wilson et al. | |
| 6,848,505 | B2 | | 2/2005 | Richard et al. | |
| 6,854,522 | B2 | | 2/2005 | Brezinski et al. | |
| 7,143,832 | B2 | | 12/2006 | Freyer | |
| 7,152,687 | B2 | | 12/2006 | Gano | |
| 7,216,706 | B2 | | 5/2007 | Echols et al. | |
| 7,252,142 | B2 | | 8/2007 | Brezinski et al. | |
| 7,264,047 | B2 | | 9/2007 | Brezinski et al. | |
| 7,299,882 | B2 | | 11/2007 | Brezinski et al. | |
| 7,320,367 | B2 | | 1/2008 | Brezinski et al. | |
| 7,363,986 | B2 | | 4/2008 | Brezinski et al. | |
| 7,404,437 | B2 | | 7/2008 | Brezinski et al. | |
| 2001/0045289 | A1 | * | 11/2001 | Cook et al. | 166/380 |
| 2001/0047866 | A1 | * | 12/2001 | Cook et al. | 166/277 |
| 2001/0047870 | A1 | * | 12/2001 | Cook et al. | 166/380 |
| 2002/0020524 | A1 | * | 2/2002 | Gano | 166/55 |
| 2002/0040787 | A1 | * | 4/2002 | Cook et al. | 166/379 |
| 2002/0046840 | A1 | * | 4/2002 | Schetky et al. | 166/277 |
| 2002/0050360 | A1 | * | 5/2002 | Cook et al. | 166/380 |
| 2002/0056553 | A1 | | 5/2002 | Duhon et al. | |
| 2002/0060068 | A1 | * | 5/2002 | Cook et al. | 166/277 |
| 2002/0060069 | A1 | * | 5/2002 | Cook et al. | 166/277 |
| 2002/0060078 | A1 | * | 5/2002 | Cook et al. | 166/380 |
| 2002/0074130 | A1 | * | 6/2002 | Cook et al. | 166/378 |
| 2002/0074134 | A1 | * | 6/2002 | Cook et al. | 166/383 |
| 2002/0084078 | A1 | * | 7/2002 | Cook et al. | 166/378 |
| 2002/0088744 | A1 | * | 7/2002 | Echols et al. | 210/170 |
| 2002/0092648 | A1 | * | 7/2002 | Johnson et al. | 166/278 |
| 2002/0092649 | A1 | * | 7/2002 | Bixenman et al. | 166/278 |
| 2002/0092654 | A1 | * | 7/2002 | Coronado et al. | 166/369 |
| 2002/0092657 | A1 | * | 7/2002 | Cook et al. | 166/382 |
| 2002/0092658 | A1 | * | 7/2002 | Johnson et al. | 166/384 |
| 2002/0096329 | A1 | * | 7/2002 | Coon et al. | 166/278 |
| 2002/0108756 | A1 | * | 8/2002 | Harrall et al. | 166/382 |
| 2002/0121372 | A1 | * | 9/2002 | Cook et al. | 166/250.07 |
| 2002/0125009 | A1 | | 9/2002 | Wetzel et al. | |
| 2002/0129939 | A1 | * | 9/2002 | Genolet et al. | 166/285 |
| 2002/0139540 | A1 | * | 10/2002 | Lauritzen | 166/387 |
| 2002/0148612 | A1 | * | 10/2002 | Cook et al. | 166/313 |
| 2002/0166668 | A1 | | 11/2002 | Metcalfe et al. | |
| 2002/0166672 | A1 | | 11/2002 | White et al. | |

| | | | | |
|---|---|---|---|---|
| 2003/0037921 | A1 | 2/2003 | Goodson, Jr. | |
| 2003/0116328 | A1 | 6/2003 | Doane et al. | |
| 2003/0141079 | A1 | 7/2003 | Doane et al. | |
| 2003/0146003 | A1 | 8/2003 | Duggan et al. | |
| 2003/0173092 | A1 | 9/2003 | Wilson et al. | |
| 2003/0205386 | A1 | 11/2003 | Johnston et al. | |
| 2003/0234102 | A1 | 12/2003 | Brothers et al. | |
| 2004/0031605 | A1 | 2/2004 | Mickey | |
| 2004/0035588 | A1 * | 2/2004 | Doane et al. | 166/382 |
| 2004/0035590 | A1 * | 2/2004 | Richard | 166/384 |
| 2004/0040703 | A1 * | 3/2004 | Longmore | 166/207 |
| 2004/0055758 | A1 | 3/2004 | Brezinski et al. | |
| 2004/0055760 | A1 * | 3/2004 | Nguyen | 166/387 |
| 2004/0112609 | A1 * | 6/2004 | Whanger et al. | 166/380 |
| 2004/0118572 | A1 | 6/2004 | Whanger et al. | |
| 2004/0123983 | A1 | 7/2004 | Cook et al. | |
| 2004/0182582 | A1 | 9/2004 | Bosma et al. | |
| 2004/0194971 | A1 | 10/2004 | Thomson | |
| 2005/0023003 | A1 | 2/2005 | Echols et al. | |
| 2005/0072579 | A1 | 4/2005 | Gambier | |
| 2005/0098324 | A1 | 5/2005 | Gano | |
| 2005/0183864 | A1 | 8/2005 | Trinder et al. | |
| 2006/0090903 | A1 | 5/2006 | Gano et al. | |
| 2007/0267201 | A1 | 11/2007 | Brezinski et al. | |
| 2008/0230234 | A9 | 9/2008 | Gano et al. | |
| 2008/0251250 | A1 | 10/2008 | Brezinski et al. | |

FOREIGN PATENT DOCUMENTS

| | | | |
|---|---|---|---|
| GB | 2 357 787 | A | 7/2001 |
| GB | 2 366 581 | A | 3/2002 |
| GB | 2 370 301 | A | 6/2002 |
| GB | 2 371 064 | A | 7/2002 |
| GB | 2 371 820 | A | 8/2002 |
| GB | 2 366 581 | A | 12/2002 |
| GB | 2 376 486 | A | 12/2002 |
| GB | 2376486 | * | 4/2003 |
| GB | 2380752 | * | 4/2003 |
| GB | 2 381 019 | A | 4/2003 |
| GB | 2 383 361 | A | 6/2003 |
| GB | 2 388 403 | A | 11/2003 |
| GB | 2 380 752 | B | 6/2004 |
| GB | 2 396 635 | A | 6/2004 |
| GB | 2 396 869 | A | 7/2004 |
| GB | 2 384 202 | B | 8/2004 |
| GB | 2398312 | A | 8/2004 |
| GB | 2398313 | A | 8/2004 |
| GB | 2 398 313 | A | 8/2004 |
| GB | 2 398 582 | A | 8/2004 |
| GB | 2 399 529 | A | 9/2004 |
| GB | 2 388 136 | B | 5/2005 |
| GB | 2 387 403 | B | 10/2005 |
| GB | 2398087 | B | 6/2006 |
| GB | 2 434 609 | B | 12/2008 |
| WO | WO 99/56000 | * | 4/1999 |
| WO | WO 99/25951 | * | 5/1999 |
| WO | WO 99/25951 | A1 | 5/1999 |
| WO | WO 99/56000 | A1 | 11/1999 |
| WO | 0061914 | A1 | 10/2000 |
| WO | WO 01/18353 | * | 3/2001 |
| WO | WO 01/18353 | A1 | 3/2001 |
| WO | WO 01/92681 | * | 12/2001 |
| WO | WO 01/92681 | A1 | 12/2001 |
| WO | WO 02/059452 | * | 1/2002 |
| WO | WO 02/059452 | A1 | 1/2002 |
| WO | WO 02/20941 | A1 | 3/2002 |
| WO | WO 02/20941 | * | 3/2002 |
| WO | WO 02/23007 | * | 3/2002 |
| WO | WO 02/23007 | A1 | 3/2002 |
| WO | 0228560 | A2 | 4/2002 |
| WO | WO 02/059451 | A1 | 8/2002 |
| WO | WO 02/059452 | A1 | 8/2002 |
| WO | 03008756 | A1 | 1/2003 |
| WO | 03023179 | A2 | 3/2003 |
| WO | WO 03/054349 | A1 | 7/2003 |
| WO | WO 03/058026 | | 7/2003 |
| WO | WO 03/060289 | | 7/2003 |
| WO | WO 2004/046500 | | 6/2004 |
| WO | 2004067906 | A1 | 8/2004 |
| WO | 2004074621 | A2 | 9/2004 |
| WO | WO 2005/088064 | A1 | 9/2005 |
| WO | WO 2006/052333 | A1 | 5/2006 |

OTHER PUBLICATIONS

Halliburton, "ResSeal Water Shutoff Resin Kit Application Instruction, " Pub. 1996, Halliburton Company.*

Inorganic Gel, Trade Name: Halliburton Energy Services Angard Service; General overview outline.*

Image File Wrapper for U.S. Appl. No. 10/252,621 filed on Sep. 23, 2002 and issued as U.S. Pat. No. 6,854,522 issued on Feb. 15, 2005 and entitled "Annular Isolators for Expandable Tubulars in Wellbores." (Total 279 Pages).

Image File Wrapper for U.S. Appl. No. 10/981,822, filed on Nov. 5, 2004, and issued as U.S. Pat. No. 7,252,142 issued on Aug. 7, 2007 and entitled "Annular Isolators for Expandable Tubulars in Wellbores." (Total 287 Pages).

Image File Wrapper for U.S. Appl. No. 11/624,747, filed on Jan. 19, 2007, and issued as U.S. Pat. No. 7,299,882 on Nov. 27, 2007 and entitled "Annular Isolators for Expandable Tubulars in Wellbores." (Total 220 Pages).

Image File Wrapper for U.S. Appl. No. 11/624,751, filed on Jan. 19, 2007, entitled "Annular Isolators for Expandable Tubulars in Wellbores", now abandoned. (Total 244 Pages).

Image File Wrapper for U.S. Appl. No. 11/624,753, filed on Jan. 19, 2007, and issued as U.S. Pat. No. 7,264,047 on Sep. 4, 2007 and entitled "Annural Isolators for Expandable Tubulars in Wellbores." (Totlal 138 Pages).

Image File Wrapper for U.S. Appl. No. 11/624,757, filed on Jan. 19, 2007, and issued as U.S. Pat. No. 7,320,367 on Jan. 22, 2008 and entitled "Annular Isolators for Expandable Tubulars in Wellbores." (Total 230 Pages).

Image File Wrapper for U.S. Appl. No. 11/624,759, filed on Jan. 19, 2007, and issued as U.S. Pat. No. 7,363,986 on Apr. 29, 2008 and entitled "Annular Isolators for Expandable Tubulars in Wellbores." (Total 290 Pages).

Image File Wrapper for U.S. Appl. No. 11/833,309 filed on Aug. 3, 2007, and issued as U.S. Pat. No. 7,404,437 on Jul. 29, 2008 and entitled "Annular Isolators for Expandable Tubulars in Wellbores." (Total 246 Pages).

Image File Wrapper for U.S. Appl. No. 12/146,401, filed on Jun. 25, 2008, and published as U.S. Pat. No. U.S. 2008–0251250 A1 on Oct. 16, 2008 and entitled "Annular Isolators for Expandable Tubulars in Wellbores." (Totla 277 Pages).

Image File Wrapper for U.S. Appl. No. 10/778,465, filed on Feb. 13, 2004, and issued as U.S. Pat. No. 7,216,706 on May 15, 2007 and entitled "Annular Isolators for Expandable Tubulars in Wellbores." (Total 333 Pages).

Image File Wrapper for U.S. Appl. No. 10/982,267, filed on Nov. 3, 2004, and issued as published as U.S. Pat. No. U.S. 2006/0090903 A1 on May 4, 2006 and corrected U.S. Pat. No. U.S. 2008/0230234 A9 on Sep. 25, 2008, entitled "System and Method For Thermal Change Compensation In An Annular Isolator." (Total 372 Pages).

Notification of Transmittal of the International Search Report or the Declaration (1 page) and International Search Report for International Application No. PCT/US04/04229, mailed Sep. 30, 2004 (Total 4 pages).
Search Report Under Section 17 (1 page); Combined Search And Examination Report Under Sections 17 & 18(3); all issued in United Kingdom Patent Application No. GB0905142.6 (Total 2 pages).
International Preliminary Report on Patentability (1 page); Written Opinion Of The International Searching Authority (4 pages); all issued in PCT International Patent Application No. PCT/US2004/004229 on Aug. 14, 2006 (Total 5 pages).
International Search Report, PCT/US03/29566, Jan. 19, 2005, (Total 8 pages).
Substantive Examination Report, dated Jun. 25, 2008, for Application No. GB0617927.9 (Total 4 pages).
Communication Supplementary Partial European Search Report, Application No. PCT/US03/29566, Mar. 2, 2006 (Total 7 pages).
International Preliminary Report on Patentability (1 page); Written Opinion Of The International Searching Authority (5 pages); all issued in PCT International Application No. PCT/US2005/034920 on May 8, 2007 (Total 6 pages).
International Search Report issued in all issued in PCT International Application No. PCT/US2005/034920 on Feb. 8, 2006 (Total 2 pages).
"Matrol and Matrol II Service Complexed Polymer Barrier for Use in Producing and Injection Wells," Field Bulletin, Halliburton Energy Services, May 1993, 5 pages.
"Polymer Treatments," Conformance Technology Manual, Halliburton, Anjel®, Chapter 4, Aug. 1995, pp. 4–34–4–35, 2 pages.
"ResSeal Water Shutoff Resin Kit Application Instructions," Halliburton Company, 1996, 4 pages.
"Inorganic Gel," Halliburton Energy Services, ANGARD® Service, 2 pages.
Tsao, Y.H. et al., "A Shear–Thickening fluid for Stopping Unwanted Flows While Drilling", JPT, vol. 37, Issue 3, pp. 359, 499–504, Mar. 1985, 8 pages.
Quinn, David et al., "Mechanism Of A Novel Shear–Sensitive Plugging Fluid To Cure Lost Circulation," SPE International Symposium On Oilfield Chemistry, Feb. 16, 1999, 9 pages.
Communication, Supplementary European Search Report, Application No. PCT/US03/29566, dated Jun. 30, 2006 (Total 15 pages).
Notification of Transmittal of International Preliminary Examination Report, International Application No. PCT/US03/29566, mailed Nov. 29, 2006, (Total 8 pages).
State Intellectual Property Office of People's Republic of China, First Office Action for Chinese Application No. 03822594.8, Issuing Date Mar. 2, 2007 (Total 6 pages).
Halliburton, ANJEL®, Conformance Technology Manual, Chapter 4, Polymer Treatments, Aug. 1995, pp. 4–34–4–35.
Halliburton Energy Services, "*MATRON* and *MATROL II* Service Complexed Polymer Barrier For Usr In Producing And Injection Wells," Field Bulletin May 1993.
Halliburton, "*ResSeal Water Shutoff Resin Kit Application Instructions*," Pub. 1996, Halliburton Company.
Inorganic Gel, Trade Name: Halliburton Energy Services Angard®Service; General overview outline.

* cited by examiner

ANNULAR ISOLATORS FOR EXPANDABLE TUBULARS IN WELLBORES

Matter enclosed in heavy brackets [ ] appears in the original patent but forms no part of this reissue specification; matter printed in italics indicates the additions made by reissue.

CROSS-REFERENCE TO RELATED APPLICATIONS

None.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

Field of the Invention

This invention relates to isolating the annulus between tubular members in a borehole and the borehole wall, and more particularly to methods and apparatus for forming annular isolators in place in the annulus between a tubular member and a borehole wall.

It is well known that oil and gas wells pass through a number of zones other than the particular oil and/or gas zones of interest. Some of these zones may be water producing. It is desirable to prevent water from such zones from being produced with produced oil or gas. Where multiple oil and/or gas zones are penetrated by the same borehole, it is desirable to isolate the zones to allow separate control of production from each zone for most efficient production. External packers have been used to provide annular seals or barriers between production tubing and well casing to isolate various zones.

It is become more common to use open hole completions in oil and gas wells. In these wells, standard casing is cemented only into upper portions of the well, but not through the producing zones. Tubing is then run from the bottom of the cased portion of the well down through the various production zones. As noted above, some of these zones may be, for example, water zones which must be isolated from any produced hydrocarbons. The various production zones often have different natural pressures and must be isolated from each other to prevent flow between zones and to allow production from the low pressure zones.

Open hole completions are particularly useful in slant hole wells. In these wells, the wellbore may be deviated and run horizontally for thousands of feet through a producing zone. It is often desirable to provide annular isolators along the length of the horizontal production tubing to allow selective production from, or isolation of, various portions of the producing zone.

In open hole completions, various steps are usually taken to prevent collapse of the borehole wall or flow of sand from the formation into the production tubing. Use of gravel packing and sand screens are common ways of protecting against collapse and sand flow. More modern techniques include the use of expandable solid or perforated tubing and/or expandable sand screens. These types of tubular elements may be run into uncased boreholes and expanded after they are in position. Expansion may be by use of an inflatable bladder or by pulling or pushing an expansion cone through the tubular members. It is desirable for expanded tubing and screens to minimize the annulus between the tubular elements and the borehole wall or to actually contact the borehole wall to provide mechanical support and restrict or prevent annular flow of fluids outside the production tubing. However, in many cases, due to irregularities in the borehole wall or simply unconsolidated formations, expanded tubing and screens will not prevent annular flow in the borehole. For this reason, annular isolators as discussed above are typically needed to stop annular flow.

Use of conventional external casing packers for such open hole completions presents a number of problems. They are significantly less reliable than internal casing packers, they may require an additional trip to set a plug for cement diversion into the packer, and they are not compatible with expandable completion screens.

Efforts have been made to form annular isolators in open hole completions by placing a rubber sleeve on expandable tubing and screens and then expanding the tubing to press the rubber sleeve into contact with the borehole wall. These efforts have had limited success due primarily to the variable and unknown actual borehole shape and diameter. The thickness of the sleeve must be limited since it adds to the overall tubing diameter, which must be limited to allow the tubing to be run into the borehole. The maximum size must also be limited to allow tubing to be expanded in a nominal or even undersized borehole. In washed out or oversized boreholes, normal tubing expansion is not likely to expand the rubber sleeve enough to contact the borehole wall and form a seal. To form an annular seal or isolator in variable sized boreholes, adjustable or variable expansion tools have been used with some success. However it is difficult to achieve significant stress in the rubber with such variable tools and this type of expansion produces an inner surface of the tubing which follows the shape of the borehole and is not of substantially constant diameter.

It would be desirable to provide equipment and methods for installing annular isolators in open boreholes, particularly horizontal boreholes, which may be carried on tubular elements as installed in a borehole and provide a good seal between production tubing and the wall of open boreholes.

SUMMARY OF THE INVENTION

The present invention provides apparatus which may be carried on or in tubing as it is run into a wellbore and deployed to form an annular isolator between the tubing and borehole. In a preferred form, the tubing is expandable tubing and the annular isolator is activated or deployed as a result of or in conjunction with expansion of the tubing. In one embodiment, an annular isolator forming material is in a compartment carried with the tubing as it is installed in a borehole and is driven from the compartment to form an annular isolator in conjunction with tubing expansion. The annular isolator forming material may be placed into the annulus between the tubing and borehole wall where it acts as an annular isolator due to its inherent viscosity or as a result of a chemical reaction which converts the material into a viscous, semisolid or solid material in place in the annulus. The material may include several chemical components which react with each other, or may be a single or multiple chemical components, which also react with ambient fluids to form an annular isolator.

In another form, the present invention includes an inflatable member carried on the outside of a tubing section. Any of the above described annular isolator forming materials may be flowed into the inflatable member to inflate it and form an annular isolator. In one form of the invention, the inflatable member includes multiple sections, which inflate at progressively increasing pressure levels. A section which inflates at the lowest pressure level is designed to expand to fill the largest expected annulus, while the other sections inflate only after the low pressure section contacts a borehole wall. The inflatable member may be inflated with material carried with the tubing in a compartment and driven from the compartment into the inflatable member as a result of tubing expansion. It may also be inflated with material pumped down the tubing itself or through a work string positioned in the tubing.

In another form of the invention, the annular isolator forming material is an elastomeric sleeve, band or ring carried on expandable tubing as it is installed in a borehole and deployed to act as an annular isolator in conjunction with expansion of the tubing. In one form, one, or preferably multiple, rings have radial and axial dimensions and shapes selected to form a fluid tight seal with a maximum borehole size after tubing expansion, and to form a seal after tubing expansion in a minimum sized borehole without exceeding maximum allowable stress. In other forms, a sleeve has a reduced radial dimension as installed on tubing for running into a borehole where its radial dimension is increased prior to or in conjunction with tubing expansion. In one form the sleeve is stretched axially as installed on the tubing and held in place by a slidable ring during tubing installation. Upon tubing expansion the ring is released and the sleeve is allowed to return to its original radial dimension. In another form the slidable ring is driven by an expansion cone to axially compress an elastomeric sleeve and increase its radial dimension. Both mechanisms may be applied to the same elastomeric sleeve. In another form, the sleeve is designed to fold upon itself or into a circumferentially corrugated shape upon axial compression, to increase its radial dimension. Pairs of such elastomeric sleeves, bands or rings may be used to isolate a section of annulus into which annular isolator forming material carried with the tubing or conveyed down hole through tubing or a work string may be placed as discussed above.

Although the embodiments of the present invention are intended to produce annular isolators in conjunction with tubing expansion with a fixed expansion cone type tool, other expansion means may also be used to advantage. Inflatable bladders may be used for primary expansion, or for overexpanding tubing sections which carry annular isolator forming materials including elastomeric sleeves, rings or bands. Adjustable or variable diameter expansion cone tools may be used to overexpand tubing sections which carry annular isolator forming materials including elastomeric sleeves, rings or bands. Internal pressure applied through the tubing or a work string may be used to overexpand selected tubing sections. Axial compression of the selected tubing sections may be used to aid over expansion of such selected tubing sections. Finally, one of skill in the art will also recognize that some of the described embodiments will function and provide many of the same advantages even when used in combination with tubing which is not expanded and/or in a portion of the borehole which has been cased.

DETAILED DESCRIPTION OF THE INVENTION

The term "annular isolator" as used herein means a material or mechanism or a combination of materials and mechanisms which blocks or prevents flow of fluids from one side of the isolator to the other in the annulus between a tubular member in a well and a borehole wall or casing. An annular isolator acts as a pressure bearing seal between two portions of the annulus. Since annular isolators must block flow in an annular space, they may have a ring like or tubular shape having an inner diameter in fluid tight contact with the outer surface of a tubular member and having an outer diameter in fluid tight contact with the inner wall of a borehole or casing. An annular isolator could be formed by tubing itself if it could be expanded into intimate contact with a borehole wall to eliminate the annulus. An isolator may extend for a substantial length along a borehole. In some cases, as described below, a conduit may be provided in the annulus passing through or bypassing an annular isolator to allow controlled flow of certain materials, e.g. hydraulic fluid, up or down hole.

The term "perforated" as used herein, e.g. perforated tubing or perforated liner, means that the member has holes or openings through it. The holes can have any shape, e.g. round, rectangular, slotted, etc. The term is not intended to limit the manner in which the holes are made, i.e. it does not require that they be made by perforating, or the arrangement of the holes.

Figure 1:
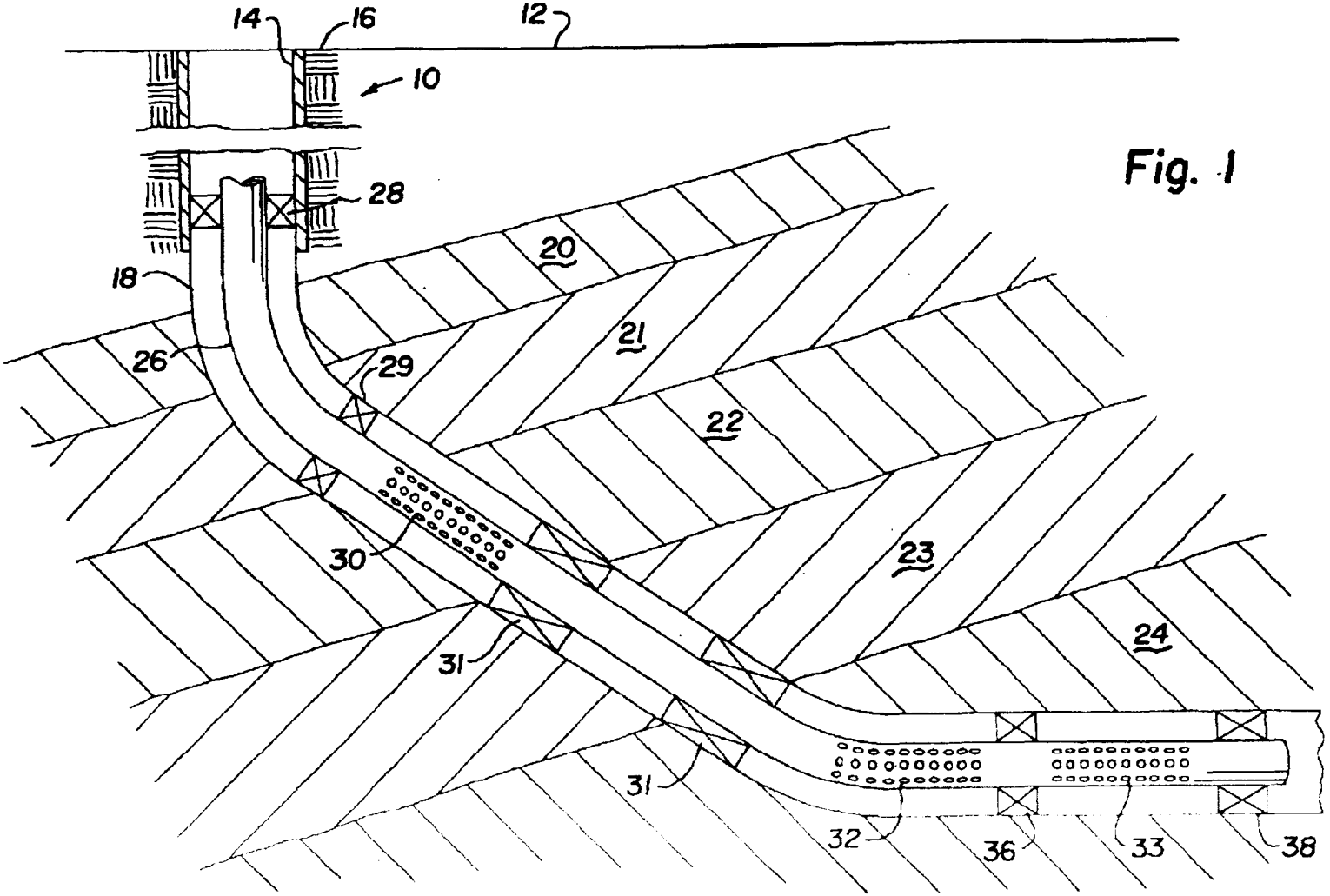
FIG. 1 is a cross-sectional view of a borehole in the earth with an open hole completion and a number of annular isolators according to the present invention.

With reference now to FIG. 1, there is provided an example of a producing oil well in which an annular isolator according to the present invention is useful. In FIG. 1, a borehole 10 has been drilled from the surface of the earth 12. An upper portion of the borehole 10 has been lined with casing 14 which has been sealed to the borehole 10 by cement 16. Below the cased portion of borehole 10 is an open hole portion 18 which extends downward and then laterally through various earth formations. For example, the borehole 18 may pass through a water bearing zone 20, a shale layer 21, an oil bearing zone 22, a nonproductive zone 23 and into another oil bearing zone 24. As illustrated in FIG. 1, the open hole 18 has been slanted so that it runs through the zones 20–24 at various angles and may run essentially horizontally through oil-bearing zone 24. Slant hole or horizontal drilling technology allows such wells to be drilled for thousands of feet away horizontally from the surface location of a well and allows a well to be guided to stay within a single zone if desired. Wells following an oil bearing zone will seldom be exactly horizontal, since oil bearing zones are normally not horizontal.

Tubing 26 has been placed to run from the lower end of casing 14 down through the open hole portion of the well 18. At its upper end, the tubing 26 is sealed to the casing 14 by an annular isolator 28. Another annular isolator 29 seals the annulus between tubing 26 and the wall of borehole 18 within the shale zone 21. It can be seen that isolators 28 and 29 prevent annular flow of fluid from the water zone 20 and thereby prevent production of water from zone 20. Within oil zone 22, tubing 26 has a perforated section 30. Section 30 may be a perforated liner and may typically carry sand screens or filters about its outer circumference. A pair of annular isolators 31 prevents annular flow to, from or through the nonproductive zone 23. The isolators 31 may be a single isolator extending completely through the zone 23 if desired. The combination of isolator 29 and isolators 31 allow production from oil zone 22 into the perforated tubing section 30 to be selectively controlled and prevents the produced fluids from flowing through the annulus to other parts of the borehole 18. Within oil zone 24, tubing 26 is illustrated as having two perforated sections 32 and 33. Sections 32 and 33 may be perforated and may typically carry sand screens or filters about their outer circumference. Annular isolators 36 and 38 are provided to seal the annulus between the tubing 26 and the wall of open borehole 18. The isolators 31, 36 and 38 allow separate control of flow of oil into the perforated sections 32 and 33 and prevent annular flow of produced fluids to other portions of borehole 18. The horizontal section of open hole 18 may continue for thousands of feet through the oil bearing zone 24. The tubing 26 may likewise extend for thousands of feet within zone 24 and may include numerous perforated sections which may be divided by numerous annular isolators, such as isolators 36 and 38, to divide the zone 24 into multiple areas for controlled production.

It is becoming more common for the tubing 26 to comprise expandable tubular sections. Both the solid sections of the tubing 26 and the perforated sections 32 and 33 are now often expandable. The use of expandable tubing provides numerous advantages. The tubing is of reduced diameter during installation which facilitates installation in offset, slanted or horizontal boreholes. Upon expansion, solid, or perforated tubing and screens provide support for uncased borehole walls while screening and filtering out sand and other produced solid materials which can damage tubing. After expansion, the internal diameter of the tubing is increased improving the flow of fluids through the tubing. Since there are limits to which expandable tubing 26 may be expanded and the borehole walls are irregular and may actually change shape during production, annular flow cannot be prevented merely by use of expandable tubing 26, including expandable perforated sections and screens 32 and 33. To achieve the desirable flow control, annular barriers or isolators 36 and 38 are needed. Typical annular isolators such as inflatable packers have not been found compatible with the type of production installation illustrated in FIG. 1 for various reasons including the fact that the structural members required to mount and operate such packers are not expandable along with the tubing string 26.

Figure 2:
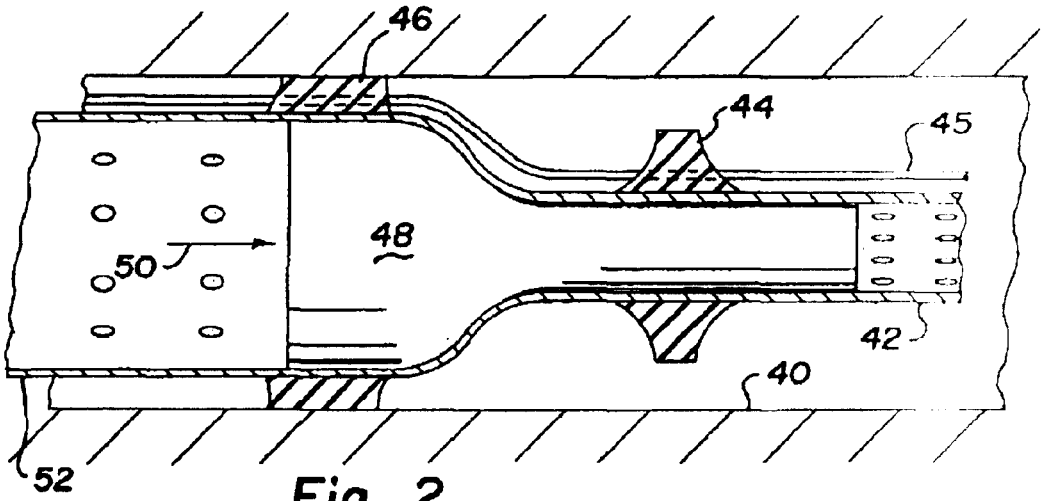
FIG. 2 is a cross-sectional illustration of expandable tubing in an open hole completion carrying elastomeric rings or bands on the outer surface of the tubing.

With reference to FIG. 2, an improved system and method of installation of annular isolators such as elements 36 and 38 shown in FIG. 1 is provided. In FIG. 2 is illustrated an expandable tubing 42 positioned within an open borehole 40. On the right side of FIG. 2, the tubing is shown in its unexpanded state and carries on it outer surface a ring or band of elastomeric material 44, for example rubber. In this embodiment, the ring 44 has fairly short axial dimensions, i.e. its length along the axial length of the tubing 42, but has a relatively long radial dimension, i.e. the distance it extends from the tubing in the radial direction towards the borehole wall 40. The rings are preferably tapered radially as illustrated to have a longer axial dimension where bonded to the outer surface of the tubing and shorter axial dimension on the end which first contacts the borehole wall. As run into the borehole, the tubing 42 carries ring 44 and a similar ring 46 which together may form a single annular isolator such as isolator 36 in FIG. 1. The rings 44 and 46 may be installed on the tubing 42 by being cast in a mold positioned around the tubing 42. The tubing may also be covered by a continuous sleeve of elastomer between rings 44 and 46 which may be formed in the same casting and curing process. Also shown in FIG. 2 is an expansion cone 48 which has been driven into the expandable tubing 42 from the left side as indicated by arrow 50. As the cone passes through the tubing from left to right, the tubing is expanded to a larger diameter as indicated at 52. As the expansion cone passed through the ring 46, the ring 46 was forced into contact wit the wall 40. Expansion of the tubing 52 reduced the radial dimension and increased the axial dimension of the ring 46, since the total volume must remain constant. Stated otherwise, the ring 46 was partially displaced axially in the annulus between the expanded tubing 52 and borehole 40. When the expansion cone 48 passes through ring 44, it will likewise be expanded into contact with the borehole wall 40. Each annular isolator 36, 38 of FIG. 1 may comprise two or more such rubber rings 44 and 46 carried on expandable tubing as illustrated in FIG. 2.

Also illustrated in FIG. 2 is a conduit 45 extending along the outer surface of tubing 42 and passing through the rings 44 and 46. It is often desirable in well completions to provide control, signal, power, etc. lines from the surface to down hole equipment. The lines may be copper or other conductive wires for conducting electrical power down hole or for sending control signals down hole and signals from pressure, temperature, etc. sensors up hole. Fiber optic lines may also be used for signal transmissions up or down hole. The lines may be hydraulic lines for providing hydraulic power to down hole valves, motors, etc. Hydraulic lines may also be used to provide control signals to down hole equipment. The conduit 45 may be any other type of line, e.g. a chemical injection line, used in a down hole environment. It is usually preferred to route these lines on the outside of the tubing rather than in the production flow path up the center of the tubing. The lines can be routed through the rubber rings 44 and 46 as illustrated while maintaining isolation of the annulus with the rings 44, 46.

The FIG. 2 embodiment solves several problems of prior art devices. Such devices have included relatively thin rubber sleeves on the outside of expandable screens, which sleeves extend for substantial distances axially along the tubing. In enlarged portions of open boreholes such sleeves typically do not make contact with the borehole and thus do not form an effective annular isolator. In well consolidated formations, such prior art sleeves may contact the borehole wall before the expandable tubing is fully expanded creating excessive forces in the expansion process. Due to their axial length, the forces required to extrude or flow such sleeves axially in the annulus cannot be generated by an expansion tool and, if they could, would damage the borehole or the tubing.

In the FIG. 2 embodiment, the elastomeric rings 44 and 46 have radial and axial dimensions selected to achieve several requirements. One requirement is for the rings to contact a borehole wall with sufficient stress to conform to the borehole wall and act as an effective annular isolator. The radial dimension or height of the ring therefore is selected to be greater than the width of the annulus between expanded tubing and the wall of the largest expected borehole. The ring will therefore be compressed radially and will expand axially in the annulus as a result of tubing expansion. By proper selection of elastomeric material and the axial length of the ring relative to the radial dimension, a minimum stress level can be generated to provide a seal with the borehole wall.

Another requirement is to avoid damage which may result from excessive stress in the rings 44, 46. Excessive stresses may be encountered when tubing is expanded in a borehole having a nominal or less than nominal diameter. Such excessive stress may damage the borehole wall, i.e. the formation, by overstressing and crushing the borehole wall. In some cases, some compression of the borehole wall is acceptable or even desirable. Excessive stress can also cause collapse or compression of the tubing after an expansion tool has passed through the rings. That is, the stress in the elastomeric rings may be sufficient to reduce the tubing diameter after an expansion tool has passed through the tubing or been removed. Excessive stress may damage or stop movement of an expansion tool itself. That is, the stress may require forces greater than those available from a given expansion tool.

When expanding tubing in minimum diameter boreholes, the elastomeric rings must be capable of axial expansion at internal stresses which are below levels which would cause damage to the borehole wall, tubing or expansion tool. The radial dimension of the rings is selected as discussed above. Based on any given radial dimension and the characteristics of the selected elastomer, the axial dimension of the ring is selected to allow expansion of the tubing in the smallest expected borehole without generating excessive pressures. The smaller the axial dimension, the less force is required to compress the elastomeric ring radially from its original radial dimension to the thickness of the annulus between the expanded tubing and the smallest expected borehole.

The tapered shape of the rings 44, 46 is one way in which the requirements can be achieved. As is apparent from the above discussion, the amount of force required to radially compress the rings 44, 46 is related to the axial length of the rings. With a tapered shape as shown in FIG. 2 (or the tapers shown in FIGS. 10 and 11), the ring does not have a single axial dimension, but instead has a range of axial dimensions. The shortest axial dimension is on the outer circumference which will first contact a borehole wall. The force required to cause radial compression and axial expansion is therefore smallest at the outer circumference. That is, the deformation of the ring during tubing expansion effectively begins with the portion which first contacts the borehole wall. This helps insure conformance of the ring with the borehole wall surface. The same effect can be achieved with other cross sectional shapes of the rings 44, 46 such as hemispherical or parabolic which would also provide a greater axial dimension adjacent the tubing and shorter axial dimension at the outer circumference of the rings.

It is preferred that an annular isolator according to the FIG. 2 embodiment include two or more of the illustrated rings 44, 46. It is also preferred that the axial dimensions of the rings be selected to allow annular expansion or extrusion of the elastomer as the ring is compressed radially. This assumes, of course, that there is available annular space into which the elastomer may expand without restriction. If adjacent rings are spaced too closely, they could contact each other as they expand axially in the annulus. Upon making such contact, the forces required for further radial compression may increase substantially. It is therefore preferred that adjacent rings 44, 46 be spaced apart sufficiently to allow unrestricted annular expansion at least in the minimum sized borehole. Since elastomers such as rubber are essentially incompressible, sufficient annular volume should be available to accommodate the volume of elastomeric material which will be displaced axially by the greatest radial compression of the rings. While the illustrated embodiment shows an absence of material between the two rings, as discussed above, there may also be a radially shorter linking sleeve action between the two rings. Even in such a case, the design could still be implemented to provide available volume (space) above the sleeve section between the two rings to accommodate the desired expansion.

Figure 3:
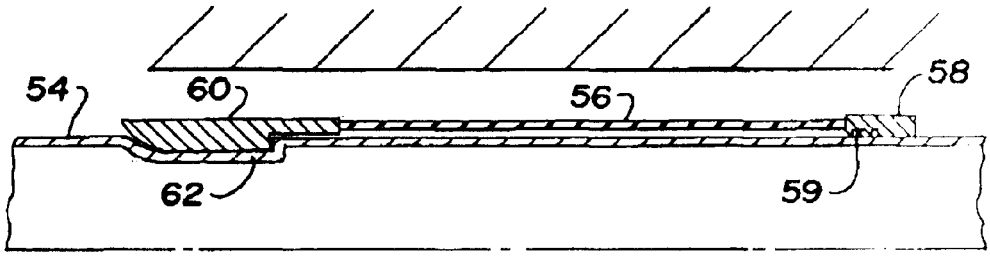
FIG. 3 is a cross-sectional illustration of an elastomeric sleeve on the outer surface of expandable tubing, which has been prestretched to reduce its thickness during installation of the tubing in the borehole.
Figure 4:
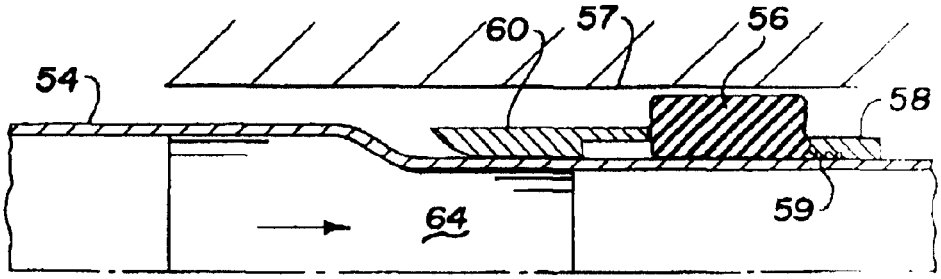
FIG. 4 is a cross-sectional illustration of the embodiment of FIG. 3 after the prestretched sleeve has been released by an expansion cone.

With reference to FIGS. 3 and 4, another embodiment of an external annular isolator is illustrated. In FIG. 3 is shown a portion of an unexpanded expandable tubular member 54. Carried on the outside of expandable member 54 is a prestretched elastomeric sleeve 56. Sleeve 56 has been stretched axially to increase its axial dimension and reduce its radial dimension from the dimensions it has when free of such external forces. One end of sleeve 56 is attached to a ring 58 which may be permanently attached to the outer surface of tubular member 54 by welding or may be releasably attached by bonding or crimping as discussed below. On the other end of elastomeric sleeve 56 is attached a sliding ring 60 which is captured in a recess 62 in the tubing 54. In FIG. 4, the elastomeric sleeve 56 is illustrated in its relaxed or unstretched condition free of the stretching force. In FIG. 4, the expansion cone 64 has been forced into the expandable member 54 from the left side and has moved past the locking recess 62. As it did so, the tubing 54 including recess 62 was expanded to final expanded diameter. When this happened, the sliding member 60 was released and the elastomeric sleeve 56 was allowed to return to its unstretched dimensions.

As noted above, it is desirable for expandable tubing to reduce the annulus between the tubing string and the borehole wall as much as possible. The tubing may be expanded only a limited amount without rupturing. It is therefore desirable for the tubing to have the largest possible diameter in its unexpanded condition as it is run into the borehole. That is, the larger the tubing is before expansion, the larger it can be after expansion. Elements carried on the outer surface of tubing as it is run in to a borehole increase the outer diameter of the string. The total outer diameter must be sized to allow the string to be run into the borehole. The total diameter is the sum of the diameter of the actual tubing plus the thickness or radial dimension of any external elements. Thus external elements effectively reduce the allowable diameter of the actual expandable tubing elements.

In the embodiment of FIGS. 3 and 4, the total overall diameter of expandable tubing 54 as it is run into the borehole is reduced by prestretching elastomeric sleeve 56 into the shape shown in FIG. 3. The reduction in radial dimension of sleeve 56 allows the tubing 54 to have a larger unexpanded diameter. As the tubing is expanded as illustrated in FIG. 4, the elastomeric sleeve 56 is allowed to return to its original shape in which it extends further radially from the tubing 54. As a result, when expansion cone 64 passes beneath elastomeric sleeve 56, it will form an annular isolator in a larger borehole or an irregular borehole. The relaxed shape of sleeve 56 is selected so that for the largest expected diameter of borehole, the sleeve will contact the borehole wall upon tubing expansion and be compressed radially with sufficient internal stress to form a good seal with the borehole wall. Upon radial compression, the sleeve 56 will expand or extrude to some extend axially along the annulus since the volume of the elastomer remains constant.

It is possible that the annular isolator of FIGS. 3 and 4 is positioned in a competent borehole which is at the nominal drilled size or is even undersized due to swelling of the borehole wall on contact with drilling fluid. In such cases, the relaxed thickness of sleeve 56 may be sufficient to contact the borehole wall 57 before expansion of tubing 54. As the cone 64 passes under the sleeve 56, it would then need to expand or extrude further axially to avoid excessive forces. This pressure relief can occur in either of two ways. The sliding ring 60 can be adapted so that, after expansion, it can slide on the expanded tubing 54 at a preselected force level. Alternatively the ring 58 can be attached to the tubing 54 with a crimp or similar bond which releases and allows limited movement at axial force above a preselected level. In either case, the maximum force exerted by the expansion of tubing 54 under the sleeve 56 can be limited while maintaining a significant stress on the sleeve 56 to achieve a seal with a borehole wall. If ring 58 is used as a pressure relief device, it is desirable to provide a locking mechanism to prevent further sliding after the expanding tool 64 has passed through the ring 58. The locking device can be one or more slip type teeth 59 on the ring 58 which will bite into the tubing 54 when it expands under the ring 58. Other mechanisms may be used to allow limited pressure relief while retaining sufficient stress in the compressed sleeve 56 to maintain a good seal to a borehole.

Figure 5:
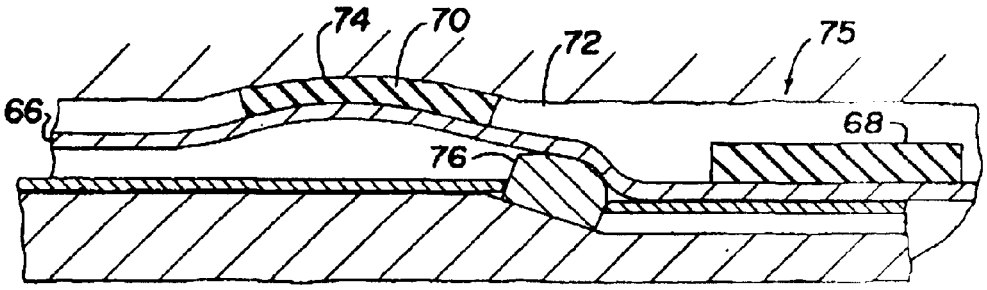
FIG. 5 is an illustration of use of an adjustable expansion cone to expand expandable tubing and an elastomeric sleeve into an enlarged portion of an open borehole to form an annular isolator.

In FIG. 5, there is illustrated a partially expanded expandable tubing section 66. Section 66 carries fixed elastomeric sleeves 68 and 70 on its outer circumference. In this illustration, the borehole wall 72 is shown with an enlarged portion 74 at the location of elastomeric sleeve 70. In this embodiment, an adjustable or variable diameter expanding cone 76 is employed to expand the tubing 66. As the tubing 66 is expanded in the area of the enlarged area 74, the diameter of the cone 76 has been increased to overexpand tubing 66 causing sleeve 70 to make a firm contact with borehole wall in region 74. In area 75 of borehole wall 72 which has not been enlarged, sleeve 68 will make contact with normal expansion of tubing 66. The variable expansion cone 76 may be used in conjunction with a fixed expansion cone such as cone 48 of FIG. 2 or cone 64 of FIG. 4. Both cones can be carried on one expansion tool string, or the adjustable cone can be carried down hole with the tubing as it is installed and picked up by the expansion tool when it reaches the end of the tubing string. After expansion of the tubing, screens, etc., by a fixed cone, the adjustable cone 76 may be used to further expand the sections with external sleeves 70 to ensure making a seal with the borehole. This can be done on a single trip into the borehole. For example, the fixed cone can expand the entire tubing string as the tool is run down the borehole and the adjustable cone can be deployed at desired locations as the tool is run back up hole.

Figure 6:
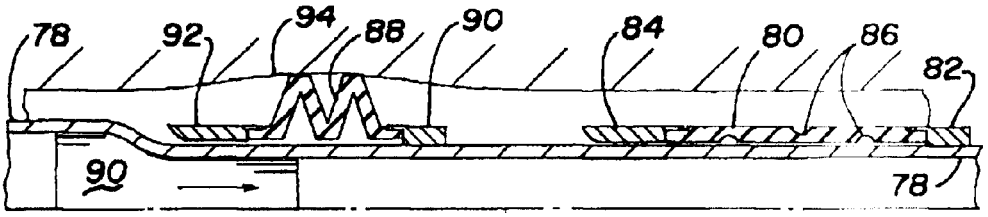
FIGS. 6 and 7 are cross-sectional illustrations of an embodiment including elastomeric sleeves on the outer surface of an expandable tubing which are folded before tubing expansion to form an annular isolator in an enlarged portion of a borehole.
Figure 7:
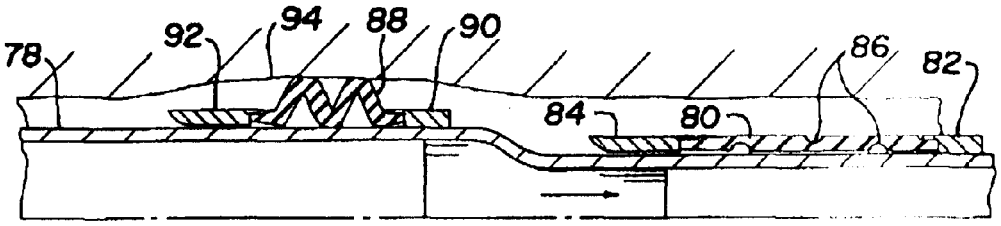

FIGS. 6, 7, 8 and 9 illustrate another embodiment having an external elastomeric sleeve which has a variable radial dimension which is increased before tubing is expanded. In FIGS. 6 and 7, an elastomeric sleeve 80 is illustrated in its position as installed for running tubing into a borehole. The sleeve 80 is connected at one end to a fixed ring 82 on the tubing 78. The ring 82 holds the sleeve 80 in place. A sliding ring 84 is connected to the other end of sleeve 80. Elastomeric sleeve 80 is notched or grooved at 86 to generate hinge or flexing sections.

A second sleeve 88 is illustrated in two stages of deployment on the left sides of FIGS. 6 and 7. Sleeve 88 was essentially identical to sleeve 80 when tubing 78 was run into a borehole. In FIG. 6, an expansion tool 90 has moved into the left side of tubing 78 and expanded a portion of tubing 78 up to a sliding ring 92 connected to the left end of sleeve 88. As the expanding portion of tubing 78 contacts ring 92, the ring is pushed to the right and folds the sleeve 88 into the accordion shape as illustrated. In the folded condition, the sleeve 88, has an increased radial dimension, i.e. it extends substantially farther from the outer surface of tubing 78 than it did as installed for running in. The sleeves 80, 88 may fold into shapes other than that shown in FIGS. 6 and 7. In alternative embodiments, the sleeves 80 and 88 may be unnotched or otherwise configured for folding and may simply be compressed by the sliding rings 84, 92 into a shape like that shown in FIG. 4. In FIG. 7, the expansion tool 90 has passed completely under the sleeve 88 and expanded the tubing 78 and expanded sleeve 88 so that the sleeve 88 has contacted a borehole wall at 94. The sliding ring 92 moved to the right until the sleeve 88 was completely folded and stopped further movement of ring 92. At that point the tool 90 passed under the ring 92, expanding it along with the tubing 78.

Figure 8:
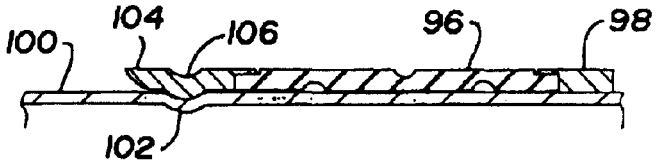
FIGS. 8 and 9 are cross-sectional illustrations of latching mechanisms for holding the elastomeric sleeve of FIGS. 6 and 7 in place during installation of tubing in a borehole.
Figure 9:
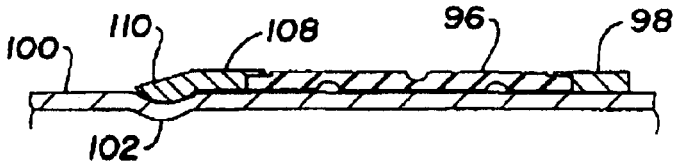

In FIGS. 8 and 9, means for holding sliding rings, such as rings 84 and 92 in FIGS. 6 and 7, in place during installation of the tubing are illustrated. In FIGS. 8 and 9, an elastomeric sleeve 96 and fixed ring 98 may be the same as parts 80 and 82 shown in FIGS. 6 and 7. In FIGS. 8 and 9, expandable tubing 100 is provided with a recess 102 for holding a sliding ring in place. In FIG. 8, a sliding ring 104 has a matching recess 106 near its center which extends into recess 102 to lock the sliding ring in place. In FIG. 9, a sliding ring 108 has an edge 110 shaped to fit within recess 102. In both the FIG. 8 and FIG. 9 embodiments, the recesses 102 will be removed or flattened as an expansion cone is forced through expandable tubing 100. When this occurs, the sliding rings 104 and 108 will no longer be locked into place and will be free to slide along the expandable tubing 100 as it is expanded. After tubing expansion, the elastomeric sleeve 96 in FIGS. 8 and 9 may take the form of sleeve 88 shown in FIG. 7.

As noted above with reference to FIGS. 3 and 4, it is possible in a small borehole that expansion of sleeve 88 as shown in FIG. 7 would result in excessive pressure or force on the expansion tool. Pressure relief can be provided in the same manner as discussed above. That is, the sliding ring 92 may be adapted to slide back to the left in response to excessive pressure on the sleeve 88. Or the ring 90 can be connected to tubing 78 with a crimp, like the arrangements shown in FIGS. 8 and 9, so that it releases and slides to the right if sufficient force is applied.

Figure 10:
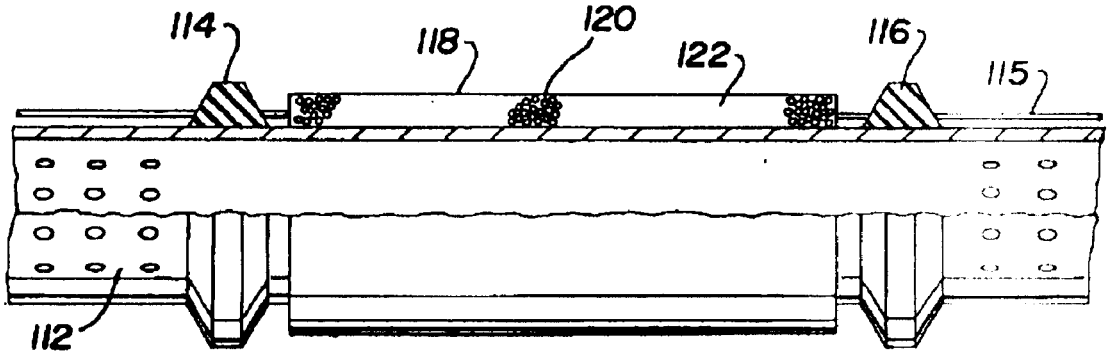
FIG. 10 is a cross-sectional illustration of expandable tubing carrying reactive chemicals in a matrix on its outer surface for installation in a borehole.

With reference now to FIG. 10, an alternate embodiment in which expanding chemical materials are used to form an annular isolator is illustrated. In FIG. 10, expandable tubing 112 is essentially the same as expandable tubing shown in the previous Figures. In this embodiment, two elastomeric rings 114 and 116, which may be essentially the same as rings 44 and 46 shown in FIG. 2, are carried on an outer surface of the tubing 112. Tubing 112 may have a fluid tight wall between the rings 114 and 116 and may be perforated on the ends of the portion which is illustrated. Between elastomeric rings 114 and 116, there is provided a cylindrical coating or sleeve 118 of various chemical materials carried on the outer wall of tubing 112. In this embodiment, the layer 118 includes solid particles of magnesium oxide and monopotassium phosphate 120 encapsulated in an essentially inert binder 122, for example dried clay. The chemicals magnesium oxide and monopotassium phosphate will react in the presence of water and liquefy. The liquid will then go to a gel phase and eventually crystallize into a solid ceramic material magnesium potassium phosphate hexahydrate. This material is generally known as an acid-base cement and is sometimes referred to as a chemically bonded ceramic. It normally hardens in about twenty minutes and binds well to a variety of substrates. Other acid-base cement systems may be used if desired. Some require up to twenty-two waters of hydration and may be useful where larger void spaces need to be filled. While this embodiment uses a material like clay as the encapsulating material 122, any other material or packaging arrangement which separates the individual chemical particles during installation of tubing 112 in a well bore and prevents liquids in the borehole from contacting chemical materials may be used. As disclosed below, the individual chemical components may be encapsulated in microcapsules, tubes, bags, etc. which separate and protect them during installation of tubing in a bore hole.

Upon driving an expansion cone through the tubing 112 as illustrated in FIG. 2, the encapsulating material 122 is broken or crushed allowing the chemical materials 120 to mix with water in the borehole annulus and react to form the solid material as discussed above. In this FIG. 10 embodiment, the elastomeric rings 114 and 116 are used primarily to hold the chemical reactants 120 in position until the chemical reaction has been completed. As the reaction occurs, the volume of chemical materials expands by the reaction with and incorporation of water and the final annular isolator is formed by the reacted chemicals. Thus, the elastomeric rings 114 and 116 are optional, but are preferred to ensure proper placement of the chemicals as they react. It is desirable that the rings 114 and 116 be designed to allow release of material in the event the chemical reaction results in excessive pressure which might damage the tubing 112. In many cases it may be desirable for one or both of the rings 114, 116 to be sized to not form a total seal with the borehole. This will allow additional water and other annular fluids to flow into the area to provide waters of hydration. With such a loose fit, the rings 114 and 116 will diminish outflow of more viscous materials such as the gel at lower pressures, while allowing some flow of more fluid materials or of the gel at excessive pressures. If desired, the chemicals may be encapsulated in a heat sensitive material and released by running a heater into the tubing 112 to the desired location.

Also illustrated in FIG. 10 is a conduit 115 passing through the rings 114, 116 and the chemical coating 118. This conduit 115 is provided for power, control, communication signals, etc. like conduit 45 discussed above with reference to FIG. 2. In this embodiment, the conduit 115 will be imbedded in the acid base cement after it sets to form an annular isolator. Many of the advantages of this described embodiment are achieved regardless of the presence or absence of the conduit 115.

Figure 11:
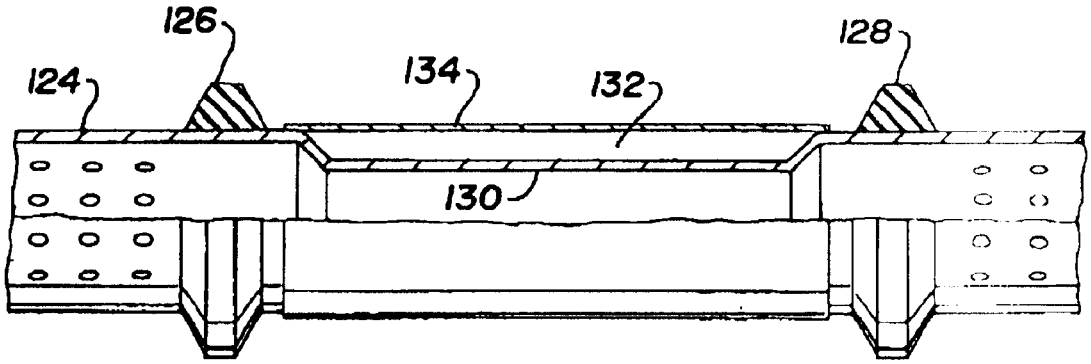
FIG. 11 is a cross-sectional illustration of expandable tubing carrying reactive chemicals in a reduced diameter portion for installation in a borehole.

FIG. 11 illustrates another embodiment using various chemical materials for forming an annular isolator. An expandable tubing section 124 preferably carries a pair of elastomeric rings 126 and 128. Between the locations of rings 126 and 128, the tubing 124 has an annular recessed area 130. Within the recess 130 is carried a swellable polymer 132 such as cross-linked polyacrylamide in a dry condition. A rupturable sleeve 134 is carried on the outer wall of tubing 124 extending across the recessed section 130. The space between sleeve 134 and recessed section 130 defines a compartment for carrying a material for forming an annular isolator, i.e. the swellable polymer 132. The sleeve 134 protects the swellable polymer 132 from fluids during installation of the tubing 124 into a borehole. The material 132 may be in the form of powder or fine or small particles which are held in place by the sleeve 134. The material 132 may also be made in solid blocks or sheets which may fracture on expansion. It may also be formed into porous or spongy sheets. If solid or spongy sheet form is used, the sleeve 134 may not be needed or may simply be a coating or film adhered to the outer surface of the material 132. When an expansion cone is forced through the tubing 124, the reduce diameter portion 130 is expanded along with the rest of tubing 124 to the final designed expanded diameter. Rubber rings 126 and 128 will be expanded to restrict or stop annular flow. The protective sheath 134 is designed to split or shatter instead of expanding thus exposing the polymer 132 to fluids in the wellbore. Polymer 132 will absorb large quantities of water and swell to several times its initial volume. The material 132 at this point will have been forced outside the final diameter of the tubing 124 and thereby into contact with the borehole wall. The combination of the swellable polymer and the elastomeric seals 126 and 128 forms an annular isolator. The annular isolator thus formed remains flexible and will conform to uneven borehole shapes and sizes and will continue to conform if the shape or size of the borehole changes.

Various other solid, liquid or viscous materials can be used as the chemical materials 132 in the FIG. 11 embodiment. The swellable polymer may be formed into sheets or solid shapes which may be carried on the tubing 124. The acid-base cement materials used in the FIG. 10 embodiment could be carried within the recess 130 and protected by the sheath 134 during installation of the tubing 124. As discussed with reference to FIG. 10, the elastomeric rings 126 and 128 are optional, but preferred to hold materials in place while reactions occur and are preferably designed to limit the amount of pressure that can be generated by the swelling materials.

Figure 12:
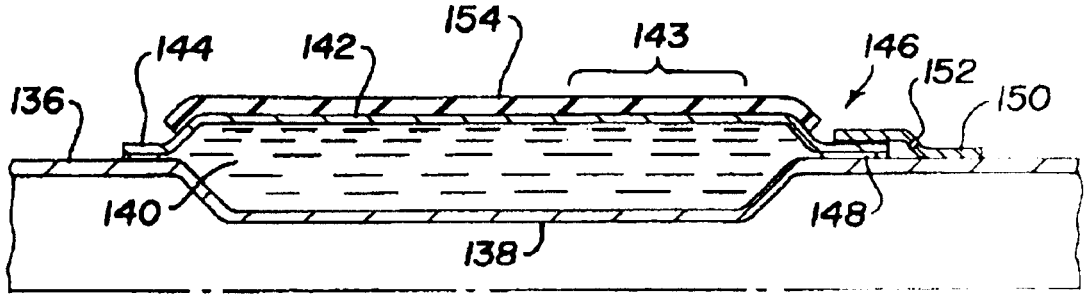
FIG. 12 is a cross-sectional illustration of expandable tubing carrying a fluid within a reduced diameter portion and covered by an expandable sleeve having a pressure relief valve.

With reference now to FIG. 12, there is illustrated another embodiment of the present invention in which a fluid may be used to inflate a sleeve. In FIG. 12, expandable tubing 136 is formed with a reduced diameter portion 138 providing a recess in which a flowable annular isolator forming material 140 may be stored. An outer inflatable metal sheath or sleeve 142 forms a fluid tight chamber or compartment with the reduced diameter section 138. This sheath 142 as installed has an outer diameter greater than the expandable member 136 to increase the amount of material 140 which may be carried down hole with the tubing 136. The outer sheath 142 is bonded by welding or otherwise to the tubing 136 at up hole end 144. At its down hole end 146, the sheath 142 is bonded to the tubing 136 with an elastomeric seal 148. A retainer sleeve 150 has one end welded to the tubing 136 and an opposite end extending over end 146 of the outer sleeve 142. The retainer sleeve 150 preferably includes at least one vent hole 152 near its center. A portion 143 of outer sleeve 142 is predisposed to expand at a lower pressure than the remaining portion of sleeve 142. The portion 143 may be made of a different material or may be treated to expand at lower pressure. For example, the portion 143 may be corrugated and annealed before assembly into the form shown in FIG. 11. Portion 143 is preferably adjacent the end 146 of sleeve 142 which would be expanded last by an expansion tool. The metallic outer sleeve 142 may be covered by an elastomeric sleeve or layer 154 on its outer surface. An elastomeric sleeve 154 is preferred on portion 143 if it is corrugated to help form a seal with a borehole wall in case the corrugations are not completely removed during the expansion process. The elastomeric sleeve 154 would also be preferred on any portion of the sleeve 142 which is perforated.

The inflatable sleeve 142 and other inflatable sleeves discussed below are referred to as "metal" sleeves or sheaths primarily to distinguish from elastomeric materials. They may be formed of many metallic like substances such as ductile iron, stainless steel or other alloys, or a composite including a polymer matrix composite or metal matrix composite. They may be perforated or heat-treated, e.g. annealed, to reduce the force needed for inflation.

In operation, the embodiment of FIG. 12 is run into a wellbore in the condition as illustrated in FIG. 12. Once properly positioned, an expander cone is forced through the tubing 136 from left to right as illustrated in FIG. 2. When the cone reaches the reduced diameter section 138 and begins expanding it to the same final diameter as tubing 136, the pressure of material 140 is increased. As pressure increases, the outer sleeve 142 is inflated outwardly towards a borehole wall. Inflation begins with the portion 143 which inflates at a first pressure level. When the portion 143 contacts a borehole wall, the pressure of material 140 increases until a second pressure level is reached at which the rest of outer sleeve 142 begins to inflate. If proper dimensions have been selected, the inflatable outer sleeve 142 and elastomeric layer 154 will be pressed into conforming contact with the borehole wall. To ensure that such contact is made, it is desirable to have an excess of material 140 available. If there is excess material and the outer sleeve 142 makes firm contact with an outer borehole wall over its whole length, the expansion process will raise the pressure of material 140 to a third level at which the polymeric seal 148 opens and releases excess material. The excess material may then flow through the vent 152 into the annular space between tubing 136 and a borehole wall. When the expander cone has moved to the end 146 of the outer sleeve 142, tubing 136 and the outer sleeve 142 will be expanded against the overlapping portion of the retainer sleeve 150. As these parts are all expanded together, a seal is reformed preventing further leakage of material 140 from the space between the tubing 136 and the outer sleeve 142. The material 140 may be any of the reactive or swellable materials disclosed herein so that the extra material vented at 152 may react, e.g. with ambient fluids, to form an additional annular isolator between the tubing 136 and the borehole wall.

In the FIG. 12 embodiment, the outer sleeve 142 is shown to have an expanded initial diameter to allow more material 140 to be carried into the borehole. As discussed above, this arrangement results in a smaller maximum unexpanded diameter of tubing 136. It would be possible to form a fluid compartment or reservoir with only the outer sleeve 142, that is without the reduced diameter tubing section 138. However, to achieve the same volume of stored fluid, the sleeve 142 would have to extend farther from tubing 136 and the maximum unexpanded diameter of tubing 136 would be further reduced.

Figure 13:
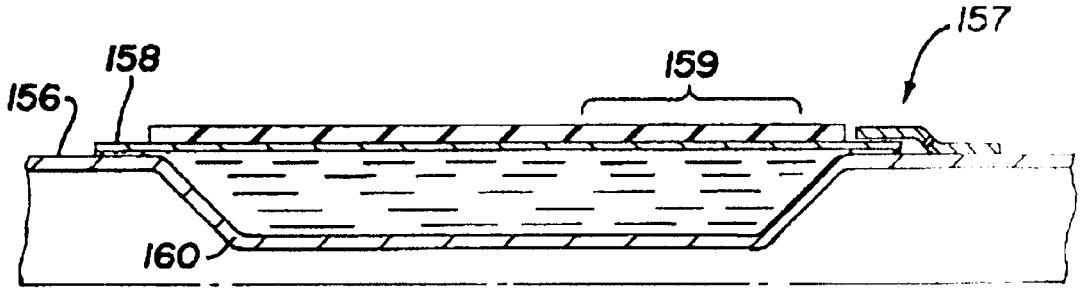
FIG. 13 is a cross-sectional illustration of expandable tubing having a reduced diameter corrugated section carrying a fluid and covered by an expandable sleeve having a pressure release valve.

FIG. 13 illustrates an alternative embodiment which allows a greater unexpanded diameter of an expandable tubing 156. In this embodiment, an outer sleeve 158 has a cylindrical shape and has essentially the same outer diameter as the tubing 156. Otherwise, the outer sleeve 158 is sealed to the tubing 156 in the same manner as the outer sleeve 142 of FIG. 11. Likewise, this embodiment includes a pressure relief arrangement 157 which may be identical to the one used in the FIG. 12 embodiment. The sleeve 158 preferably has a portion 159 predisposed to expand at a lower pressure than the remaining portion of sleeve 158, like the portion 143 of outer sleeve 142 of FIG. 12. Sleeve 158 may carry an outer elastomeric sleeve like sleeve 154 in FIG. 12.

Figure 14:
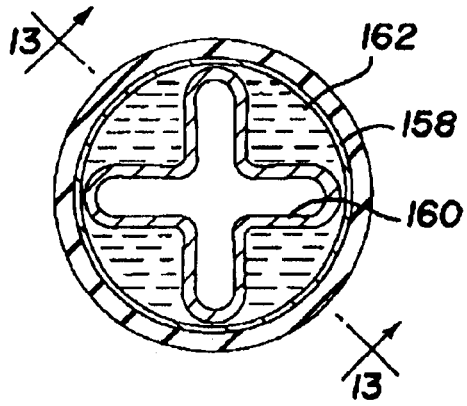
FIG. 14 is a cross-sectional view of the FIG. 13 embodiment which illustrates corrugated expandable tubing and the location of annular isolator forming material.

In order to provide storage space for a large volume of annular isolator forming material in the FIG. 13 embodiment, a reduced diameter portion 160 of tubing 156 is corrugated as illustrated in FIG. 14. It is preferred that the portion 160 be formed from tubing having a larger unexpanded diameter than the unexpanded diameter of tubing 156. During corrugation of the portion 160, the tubing wall may be stretched to have a larger total circumference after corrugation and then annealed to relieve stress. Each of these arrangements helps reduce total stresses in the section 160 which result from unfolding the corrugations and expanding to final diameter. As can be seen from FIG. 14, the crimping or corrugation of the section 160 of tubing 156 produces relatively large spaces 162 for storage of expansion fluid. When an expansion cone is run through the tubing in the embodiment of FIG. 13, the corrugations are unfolded driving the materials in spaces 162 to inflate the outer sleeve 158 in the same manner as described with respect to FIG. 12. Except for the unfolding of the corrugated section 160, the embodiment of FIG. 13 operates in the same way as the FIG. 12 embodiment. That is, as an expansion tool moves through tubing 156 from left to right, material 162 reaches a first pressure level at which sleeve section 159 expands until it contacts a borehole wall. Then the material reaches a second pressure level at which the rest of sleeve 158 expands. If the whole sleeve 158 contacts the borehole wall, a third pressure level is reached at which the relief valve arrangement 157 vents excess material into the annulus.

The pressure relief arrangements shown in FIGS. 12 and 13, and in many of the following embodiments, are preferred in expandable tubing systems which use a fixed diameter cone for expansion. It is often desirable that the inner diameter of an expandable tubing string be the same throughout its entire length after expansion. Use of a fixed diameter expansion tool provides such a constant internal diameter. The pressure relief mechanism provides several advantages in such systems. It is desirable that a large enough quantity of expansion material be carried down hole with the expandable tubing to ensure formation of a good annular isolator in an oversized, e.g. washed out, and irregularly shaped portion of the borehole. If the borehole is of nominal size or undersized, there will then be more fluid than is needed to form the annular isolator. If there were no pressure relief mechanism, excessive pressure could occur in the material during expansion and the expansion tool could experience excessive forces. The result could be rupturing of the tubing or stoppage or breaking of the expansion tool. The pressure relief mechanisms release the excess material into the annulus to avoid excess pressures and forces, and, with use of proper materials, act as additional annular isolators.

Figure 15:
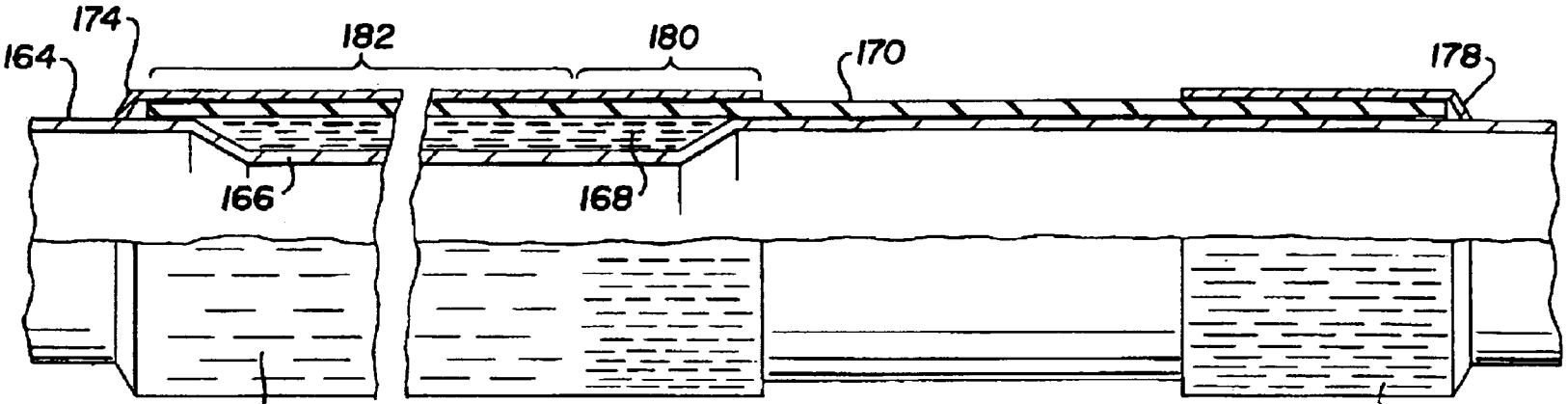
FIG. 15 is a partial cross-sectional illustration of another embodiment of the present invention having an annular isolator forming fluid carried within a recess in expandable tubing and arranged to inflate an elastomeric sleeve upon tubing expansion.
Figure 16:
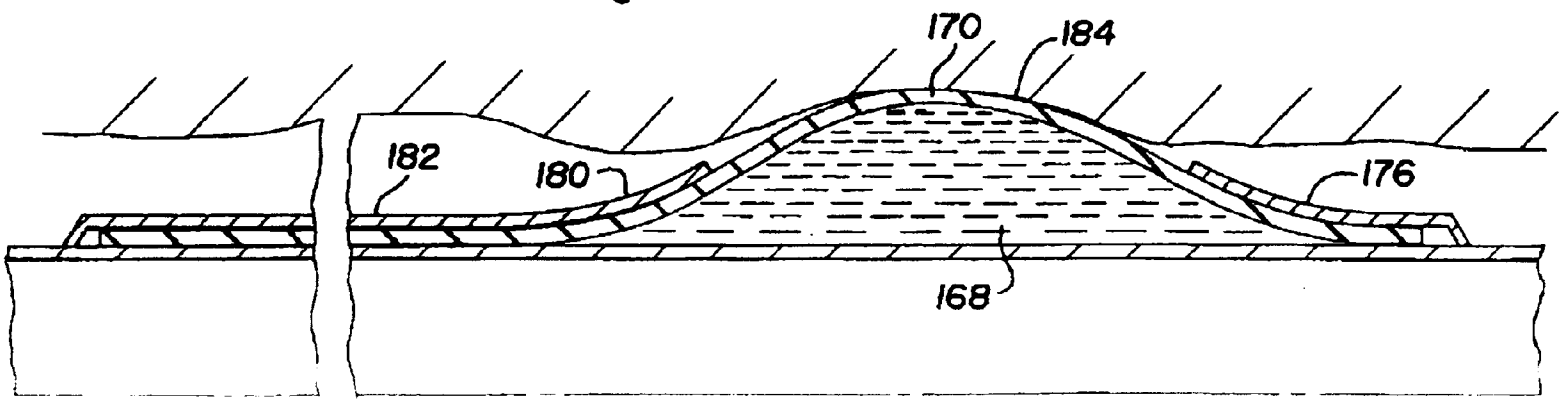
FIG. 16 illustrates the condition of the FIG. 14 embodiment after the expandable tubing has been expanded.

FIGS. 15 and 16 illustrate another embodiment of the present invention in which a material carried with expandable tubing as installed in a borehole is used to inflate an annular isolator. In FIG. 15, an expandable tubular member 164 includes a reduced diameter section 166 providing a compartment for storage of an isolator forming material, preferably a fluid 168. The fluid 168 is held in place by an elastomeric sleeve 170 which completely covers the fluid 168 and extends a substantial additional distance along the outer surface of the expandable tubing 164. A first section of perforated metallic shroud 172 is connected at a first end 174 to the expandable tubing 164. The shroud 172 extends around the elastomeric sleeve 170 for a distance at least equal to the length of the reduced diameter section 166 of the tubing 164. A second section of shroud 176 has one end 178 connected to the tubular member 164. Shroud 176 covers and holds in place one end of the elastomeric sleeve 170. Between shroud section 172 and 176, a portion of the elastomeric sleeve 170 is exposed. The shroud section 176 and a portion 180, adjacent the exposed portion of sleeve 170, of shroud 172 are highly perforated and therefore designed to expand relatively easily. The remaining portion 182 of shroud 172 has only minimal slotting (or in some embodiments no slotting) and requires greater pressure to expand. If desired, both shroud sections 172 and 176 may be covered by a second elastomeric sleeve to improve sealing between a borehole wall and the shrouds after they are expanded.

FIG. 16 illustrates the condition of this embodiment after an expander cone has been driven through the expandable tubing 164 from left to right in FIGS. 15 and 16. As the forcing cone moves through the tubing 164, the fluid 168 is first forced to flow under the exposed portion of the elastomeric sleeve 170. As illustrated in FIG. 16, it will expand until it contacts and conforms to a borehole wall 184. In this embodiment, it is preferred that the reduced diameter section 166 of the tubing 164 be considerably longer than the exposed portion of the rubber sleeve 170. By a proper selection of the ratio of these lengths, sufficient material 168 is available to provide a very large expansion of the rubber sleeve 170. As the elastomeric sleeve 170 expands into contact with the borehole wall, the pressure of fluid 168 increases and the highly perforated shroud portions 176 and 180 will expand also. If additional fluid is available after expansion of highly perforated shroud portions 176 and 180 into contact with the borehole wall, the fluid pressure will rise sufficiently to cause expansion of the minimally perforated portion 182 of the shroud 172. The slotting of portion 182 therefore provides a pressure relief or limiting function. It is also desirable to include a relief mechanism as shown in FIGS. 12 and 13 to provide an additional pressure limiting mechanism, in case the borehole is of nominal size or undersized.

Figure 17:
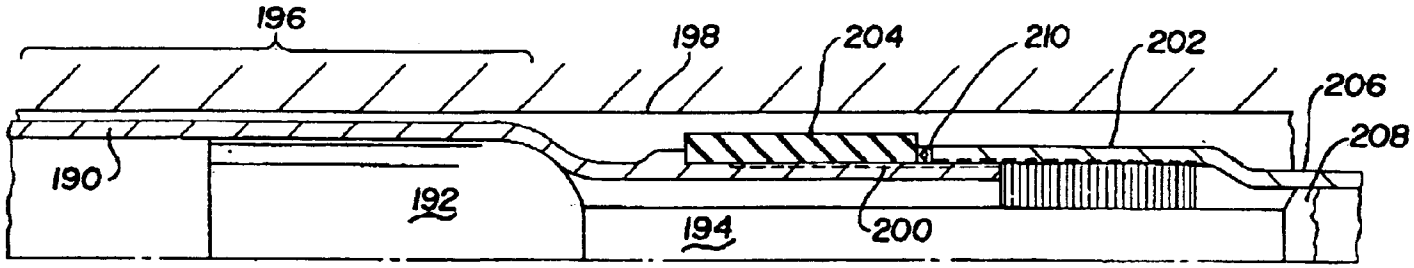
FIGS. 17, 18, and 19 are cross-sectional illustrates of an expandable tubing assembly having an elastomeric sleeve which can be expanded as part of the tubing expansion process.
Figure 18:
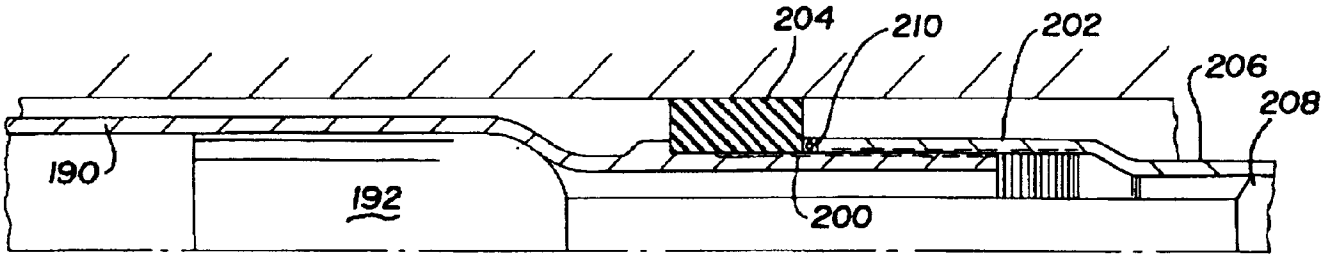
Figure 19:
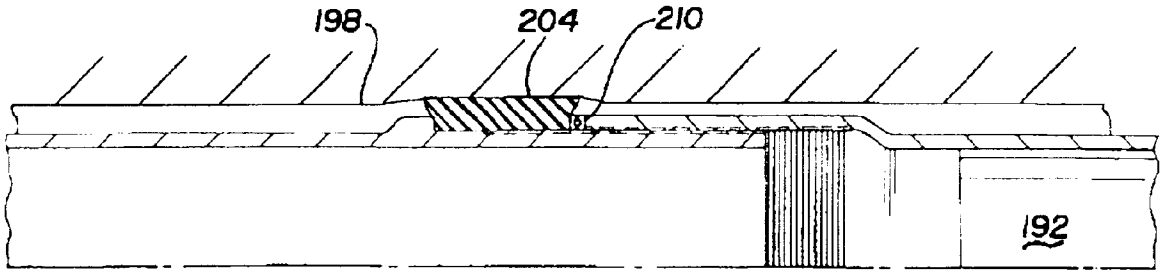

With reference now to FIGS. 17, 18, and 19, there is shown an annular isolator system which provides precompression of an external elastomeric sleeve before expansion of the tubing on which the sleeve is carried. In FIG. 17, expandable tubing 190 is shown having been partially expanded by an expansion tool 192 carried on a pilot expansion mandrel 194. In FIG. 17, the expanded portion 196 may carry an external screen expanded into contact with a borehole wall 198. To the right of this expanded portion is provided a threshold joint between expandable tubing sections 200 and 202. An elastomeric sleeve 204 is carried on the outer diameter of portion 200. The threaded portion 202 is connected to a reduced diameter section 206 of the expandable tubing into which a portion 208 of the expansion mandrel 194 has been pushed to form an interference fit. The mandrel portion 208 is preferably splined on its outer surface to form a tight grip with reduced diameter section 206. A rotating bearing 210 is provided between the elastomeric sleeve 204 and the lower tubing section 202.

After the tubing string 190 has been expanded to the point shown in FIG. 17, the expansion mandrel 194 is rotated so that its splined end 208 causes rotation of tubing section 202 relative to section 200. As a result of the threaded connection, the elastomeric member 204 is compressed axially so that its radial dimension is increased as illustrated in FIG. 18.

Once the elastomeric sleeve 204 has been expanded as illustrated in FIG. 18, the expansion cone 192 may be forced through the tubing string 190 past the tubing sections 200 and 202 expanding all the sections to final diameter and driving elastomeric sleeve 204 into engagement with borehole wall 198 as shown in FIG. 19. As the tubing string 190 is expanded, the threaded connection between sections 200 and 202 are firmly bonded together to prevent further rotation.

Figure 20:
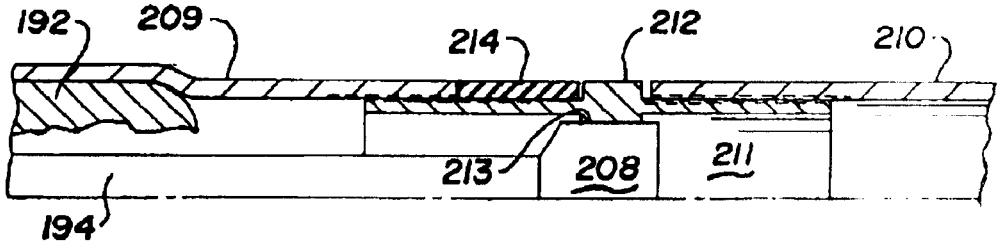
FIG. 20 is a cross sectional illustration of an alternative form of the embodiment of FIGS. 17, 18 and 19.

With reference to FIG. 20, an alternative form of the embodiment of FIGS. 17, 18 and 19 is illustrated. In this embodiment the same expansion tool including expansion cone 192, mandrel 194 and splined end 208 may be used. Two expandable tubing sections 209 and 210 are connected by an internal sleeve 211. The sleeve 211 has external threads on each end which mate with internal threads on sections 209 and 210. The sleeve has an external flange 212 and an internal flange 213 near its center. An elastomeric sleeve 214 is carried on sleeve 211 between the external flange 212 and the tubing section 209. The internal flange 213 is sized to mate with the splined end 208 of mandrel 194. This FIG. 20 system operates in essentially the same way as the system shown in FIGS. 17, 18 and 19. As the expansion cone 192 is passing through and expanding the tubing section 209, the splined end 208 engages the internal flange 213. Expansion cone downward movement is stopped and mandrel 194 is rotated to turn the sleeve 211 relative to both tubing sections 209 and 210. As sleeve 211 turns, it moves the external flange 212 away from tubing section 210 and towards section 209 axially compressing the elastomeric sleeve 214 between the flange 212 and the end of tubing section 209. The sleeve 214 will increase in radial dimension as illustrated in FIG. 18. Then the expansion cone may be driven through the rest of tubing 209, the sleeve 211 and the tubing 210 to expand the tubing and force the elastomeric sleeve 214 outward toward a borehole wall to close off the annulus as illustrated in FIG. 19.

Figure 21:
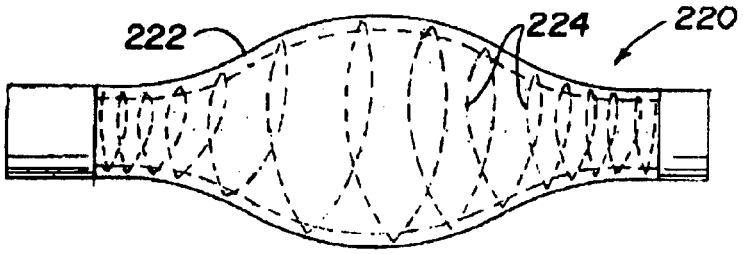
FIGS. 21, 22, and 23 are cross-sectional illustrations of an elastomeric sleeve with an embedded spring that may be carried on an expandable tubing and released to form an annular isolator as a result of expansion of the tubing.
Figure 22:
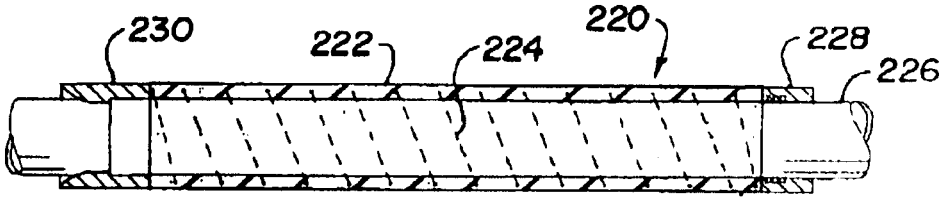
Figure 23:
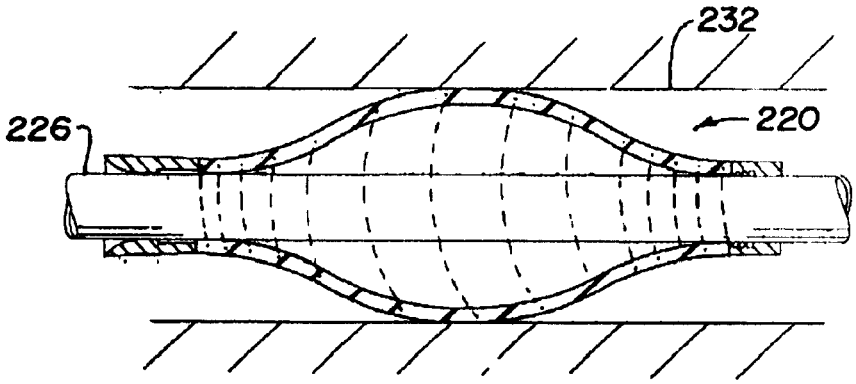

With reference now to FIGS. 21, 22 and 23, there is illustrated an embodiment of the present invention in which a coil spring is used to expand an external elastomeric sleeve to form an annular isolator. In FIG. 21, an elastomeric sleeve 220 is illustrated in its relaxed or natural shape as it would be originally manufactured, sleeve 220 is made up of two parts. It includes a barrel shaped elastomeric sleeve 222. That is, the sleeve 222 has a diameter at each end corresponding to the outer diameter of an unexpanded tubular member and a larger diameter in its center. Embedded within the elastomeric sleeve 222 is a coil spring 224 having generally the same shape in its relaxed condition. In FIG. 22, the sleeve 220 is shown as installed on a section of unexpanded expandable tubing 226 for running into a borehole. The member 220 has been stretched lengthwise causing it to conform to the outer diameter of the tubing 226. The sleeve 220 may be held onto the tubing 226 by a fixed ring 228 on its down hole end and a sliding ring 230 on its up hole end. The rings 228 and 230 may be essentially the same as the rings 58 and 60 illustrated in FIG. 3. Sliding ring 230 would be releasably latched into a recess formed on the outer surface of expandable tubing 226 to keep the sleeve 220 in its reduced diameter shape for running into the tubing in the same manner as shown in FIG. 3.

FIG. 23 illustrates the shape and orientation of the elastomeric sleeve 220 after the tubing 226 has been placed in an open borehole 232 and an expansion cone has been driven through the tubing 226 from left to right. As illustrated in FIG. 4, the expansion cone expands the tubing 226 including a recess holding sliding ring 230 which releases the sliding ring 230 and allows the sleeve 220 to return to its natural shape shown in FIG. 21. Upon thus expanding, the sleeve 220 contacts the borehole wall 232 forming an annular isolator.

Figure 24:
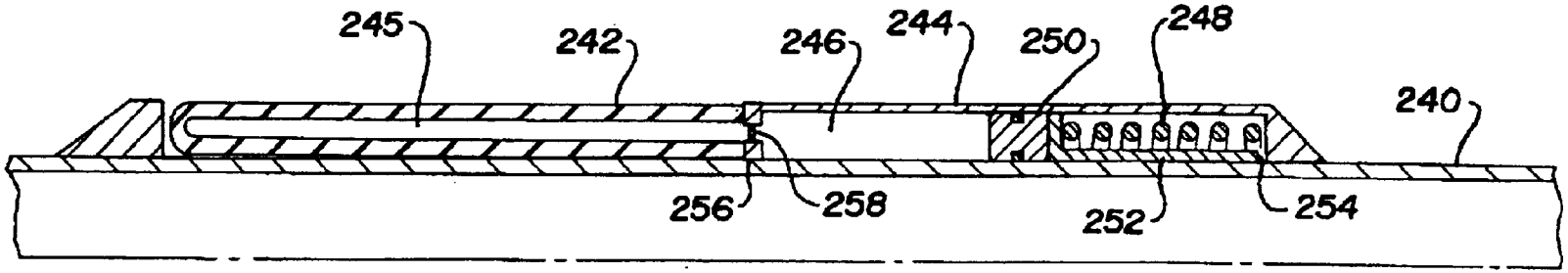
FIGS. 24 and 25 are illustrations of expandable tubing having an inflatable bladder and a two part chemical system driven by a spring-loaded piston for inflating the bladder as part of expansion of the tubing.
Figure 25:
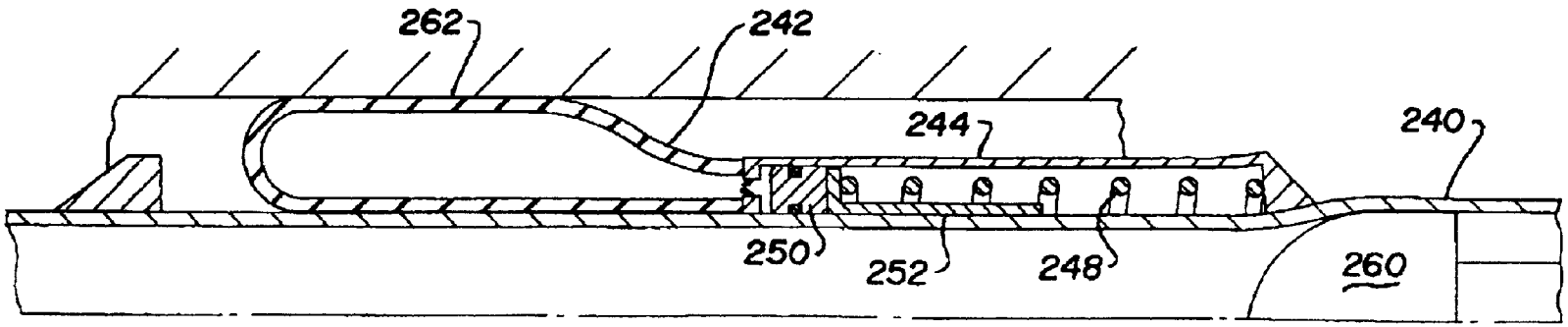

With reference to FIGS. 24 and 25, there is illustrated a system including an external elastomeric bladder which is inflated by fluid in conjunction with expansion of expandable tubing section 240. An expandable bladder 242 is carried on the outside of the expandable tubing 240. Also carried on the outside of tubing 240 is an annular fluid chamber 244. In one end of chamber 244 is a fluid 246 and in the other end in a compressed spring 248. Between the fluid 246 and spring 248 is a sliding seal 250. A spring retainer 252 within the chamber 244 holds the spring 248 in a compressed state by means of a release weld 254. A port 256 between the chamber 244 and the bladder 242 is initially sealed by a rupture disk 258.

In FIG. 25, an expansion cone 260 is shown moving from right to left expanding the tubing 240. As the release weld 254 is expanded, it breaks free from spring retainer 252 releasing the spring 248 to drive the sliding piston 250 to the left which injects the fluid 246 through the rupture disk 258 into the bladder 242. The bladder 242 is thus expanded before the expansion cone 260 reaches that part of the expandable tubing 240 which carries the bladder 242. As the expansion cone continues from right to left and expands the tubing 240, it further drives the inflated bladder 242 in firm contact with borehole wall 262.

In a preferred embodiment, the bladder 242 is partly filled with a chemical compound 245 which will react with a chemical compound 246 carried in chamber 244. When the compound 246 is driven into the bladder 242, the two chemical parts are mixed and they react to form a solid or semi-solid plastic material and/or expand.

In the FIG. 24, 25 embodiment, the spring 248 can be replaced with other stored energy devices, such as a pneumatic spring. This embodiment can also be operated without a stored energy device. For example, the spring 248, retainer 252 and the piston 250 may be removed. The entire volume of chamber 244 may then be filled with fluid 246. As the expansion cone 260 moves from right to left, it will collapse the chamber 244 and squeeze the fluid 246 through port 256 into the bladder 242. The bladder would be filled before the cone 20 moves under it and expands it further as tubing 240 is expanded.

It is desirable to provide a pressure relief or limiting arrangement in the FIGS. 24, 25 embodiment. If the bladder 242 is installed in a nominal or undersized portion of a borehole, it is possible that excessive pressure may be experienced as the expansion cone passes under the bladder. In the above described embodiment in which the chamber 244 is filled with fluid and no spring is used, the outer wall of chamber 244 may be designed to expand at a pressure low enough to prevent damage to the bladder 242 or the expansion tool 260. A pressure relief valve may also be included in the chamber 244 to vent excess fluid if the chamber 244 itself expands into contact with a borehole wall.

Figure 26:
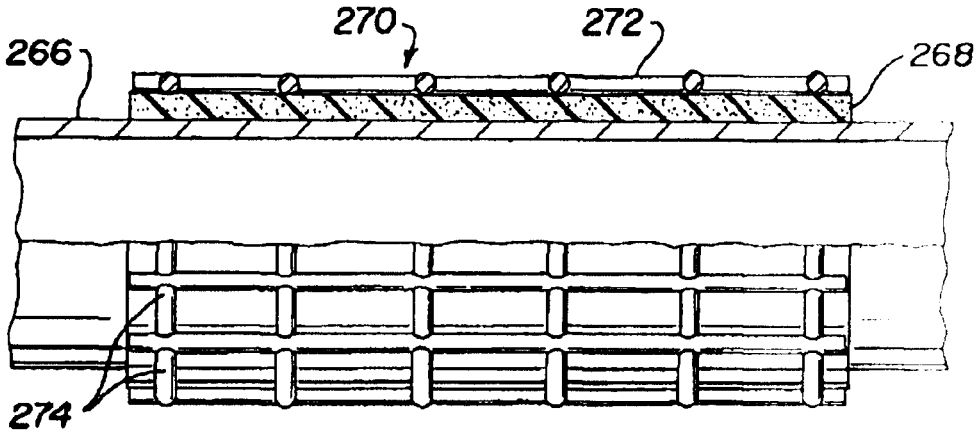
FIG. 26 is a partially cross-sectional view of an expandable tubular element carrying a compressed foam sleeve held in position by a grid which may be released upon expansion of the tubing.

With reference now to FIG. 26, there is illustrated an expandable tubing section 266 on which is carried a compressed open cell foam sleeve 268 which may be expanded to form an annular isolation device. The foam 268 is a low or zero permeability open cell foam product which restricts flow in the annular direction. It is elastically compressible to at least 50% of it initial thickness and reversibly expandable to its original thickness. Before running the tubing 266 into a well, the foam sleeve 268 is placed over the tubing and compressed axially and held in place by a cage 270 formed of a series of longitudinal members 272 connected by a series of circular rings 274. The cage 270, or at least the rings 274, are formed of a brittle or low tensile strength material which cannot withstand the normal expansion of tubing 266 which occurs when an expansion cone passes through the tubing. Therefore, as the tubing is expanded, for example as illustrated in FIG. 2, the cage 270 fails and releases the foam 268 to expand to its original thickness or radial dimension. As this is occurring, the tubing 266 itself is expanded pressing the foam 268 against the borehole wall to form an annular isolator.

The foam 268 may be made with reactive or swellable compounds carried in dry state within the open cells of the foam. For example, the components of an acid-base cement as discussed with Reference to FIG. 10 or the cross-linked polyacrylamide discussed above with reference to FIG. 11, may be incorporated into the foam. A protective sleeve like sleeve 134 of FIG. 11 may be used to protect the chemicals from fluid contact during installation. After expansion of the tubing 266, the chemicals would be exposed to formation fluids and react to form a cement or swellable mass to obtain structural rigidity and impermeability of the expanded foam.

Other mechanisms may be used to compress the foam 268 as the tubing 266 is run into a borehole. For example, helical bands or straps connected to the tubing 266 at each end of the foam sleeve could be used. The end connections could be arranged to break on expansion, releasing the foam 268. Alternatively, the foam 268 could be covered by a vacuum shrunk plastic film. Such a film could also protect chemicals incorporated into the foam 268 prior to expansion. The plastic film can be prestretched to its limit, so that upon further expansion by a tubing expansion tool, the film splits, releasing the foam 268 to expand and exposing chemicals to the ambient fluids.

Figure 27:
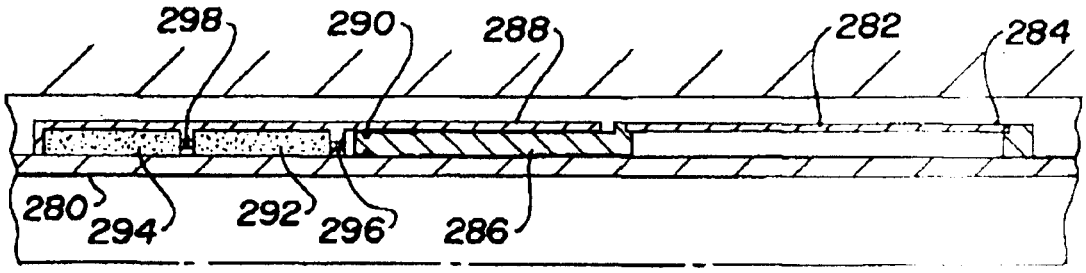
FIG. 27 is a cross-sectional illustration of expandable tubing carrying a sleeve which may be expanded by a chemical reaction driving a piston which is initiated by expansion of the tubing.

With reference now to FIG. 27 there is illustrated an annular isolator system using a chemical reaction to provide power to forcibly drive a sleeve into an expanded condition. A section of expandable tubing 280 carries a sleeve 282 on its outer surface. One end 284 of the sleeve 282 is fixed to the tubing 280. On the other end of the sleeve 282 is connected a cylindrical piston 286 carried between a sleeve 288 and the tubing 280. On the end of piston 286 is a seal 290 between the piston 286 and the sleeve 288 on one side and the expandable tubing 280 on the other side. The sleeve 282 may be elastomeric or metallic or may be an expandable metallic sleeve with an elastomeric coating on its outer surface. Two chemical chambers 292 and 294 are formed between a portion of the sleeve 288 and the expandable tubing 280. A rupture disk 296 separates the chemical chamber 292 from the piston 286. A frangible separator 298 separates the chemical chamber 292 from chamber 294.

In operation of the FIG. 27 embodiment, an expansion cone is driven from left to right expanding the diameter of the tubing 280. As the expansion reaches the separator 298, the separator is broken allowing the chemicals in chambers 292 and 294 to mix and react. In this embodiment, the chemicals would produce a hypergolic reaction generating considerable force to break the rupture disk 296 and drive the piston 286 to the right in the figure. When this happens, the sleeve 282 will buckle and fold outward to contact the borehole wall 300. As a forcing cone passes under the sleeve 282, it will further compress the sleeve 282 against borehole wall 300 forming an annular isolator.

Figure 28:
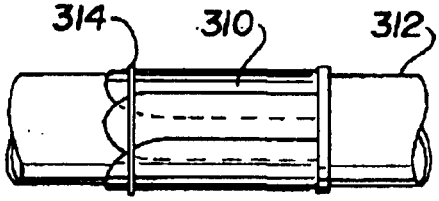
FIGS. 28 and 29 are illustrations of expandable tubing carrying folded plates which may be expanded to form a basket upon expansion of the tubing.
Figure 29:
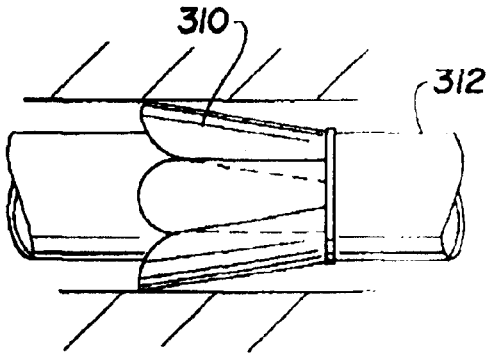

With reference to FIGS. 28 and 29, there is illustrated an embodiment of the present invention using petal shaped plates to form an annular isolator. In FIG. 29, there is illustrated the normal or free-state position of a series of plates 310 carried on an expandable tubing section 312. Each plate has one end attached to the outer surface of tubing 312 along a circumferential line around the tubing. The plates are large enough to overlap in the expanded condition shown in FIG. 29. Together the plates 310 form a conical barrier between the tubing 312 and a borehole wall. For running into the borehole, the plates 310 are folded against the tubing 312 and held in place by a strap 314. The strap or ring 314 is made of brittle material which breaks upon any significant expansion. As an expansion cone is driven through the tubing 312 from left to right, the strap 314 is broken, releasing the plates 310 to expand back toward their free state position like an umbrella or flower until they contact a borehole wall. One or more sets of the plates 310 may be used in conjunction with other embodiments of the present invention such as those shown in FIGS. 10 and 11. The plates 310 may be used in place of the annular elastomeric rings 114, 116, 126 and 128 shown in those figures. The plates 310 may be made of metal and may be coated with an elastomeric material to improve sealing between the individual plates and between the plates and the borehole wall. Alternatively, the plates may be permeable to fluids, but impermeable to gels or to particulates. For example, permeable plates may be used to trap or filter out fine sand occurring naturally in the annulus or which is intentionally placed in the annulus to form an annular isolator.

Many of the embodiments illustrated in previous figures carry annular isolator forming material on the outer surface of expandable tubing. The material may be a somewhat solid elastomeric material or a fluid material which is injected into the annular space between a section of tubing and a borehole wall to form an annular isolator. To the extent such materials are carried on the external surface of expandable tubing, the overall diameter of the tubing itself must typically be reduced to allow the tubing to be run into a borehole. In addition, any material carried on the outside surface of the tubing are subject to damage during installation in a borehole.

Figure 30:
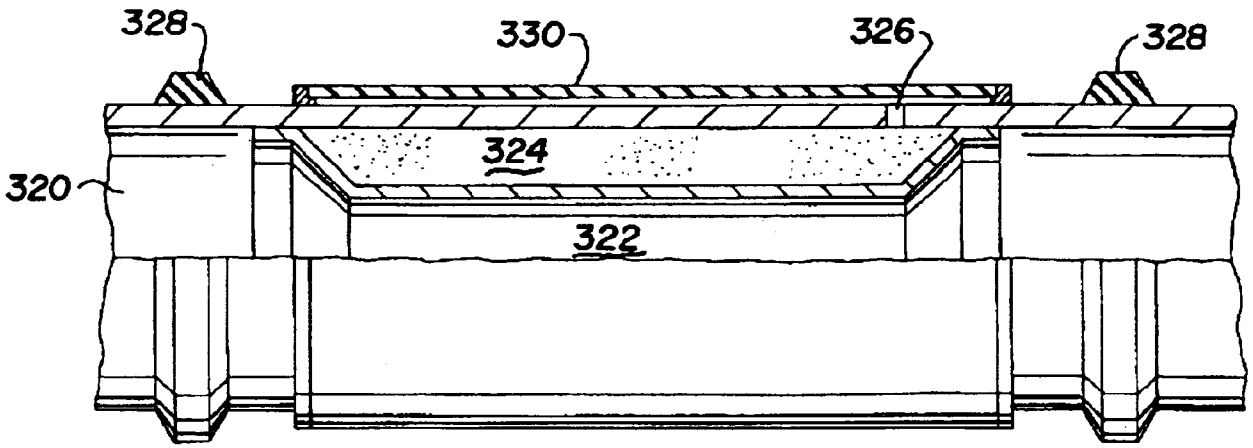
FIG. 30 is a cross-sectional illustration of expandable tubing having an interior chamber carrying an annular isolator forming material which may be forced into an external inflatable sleeve upon passage of an expansion cone through the expandable tubing.

With reference to FIG. 30, there is illustrated an embodiment in which the annular isolator forming material is carried on the inner surface of an expandable tubing section. In FIG. 30 is shown a section 320 of expandable tubing in its unexpanded condition. On the inner surface of tubing 320 is carried a cylindrical sleeve 322 attached at each end to the inner surface of tubing 320. The space between sleeve 322 and the tubing 320 defines a compartment in which is carried a quantity of isolator forming material 324. The inner sleeve 322 may be of any desired length, preferably less than one tubing section, and may thus carry a considerable quantity of material 324. One or more ports 326 are provided through expandable tubing section 320 near one end of the inner sleeve 322. The ports 326 should be positioned at the end opposite the end of sleeve 322 which will be first contacted by an expansion tool. Port 326 preferably includes a check valve which allows material to flow from the inside of tubing 320 to the outside, but prevents flow from the outside to the inside. If desired, various means can be provided to limit the annular flow of material 324 after it passes through the ports 326. Annular elastomeric rings 328 may be placed on the outer surface of tubing 320 to limit the flow of the material 324. Alternatively, an expandable bladder 330 may be attached to the outer surface of expandable tubing 320 to confine material which passes through the ports 326. The expandable bladder 330 may be formed of an expandable metal sleeve or elastomeric sleeve or a combination of the two.

In operation, the embodiment of FIG. 30 will be installed in an open borehole at a location which needs an annular isolator. An expansion cone is then driven through expandable tubing 320 from left to right. When the expansion cone reaches the inner sleeve 322, the sleeve 322 is expanded against the inner wall of tubing 320 applying pressure to material 324 which then flows through the ports 326 to the outer surface of expandable tubing 320. Alternatively, the sleeve 322 may be designed so that the ends of sleeve 322 slide on or are torn away from the inner surface of tubing 320 by the expansion cone. As the cone moves, it can compress the sleeve and squeeze the material 324 through the ports 326. The compressed inner sleeve 322 would then be forced down hole with the expansion tool. If the outer sleeve 330 is used, the material 324 may be any type of liquid, gas, or liquid like solid (such as glass or other beads) which will inflate the sleeve 330 to form a seal with the borehole wall. If sleeve 330 is used, it is preferred to provide a pressure relief mechanism like arrangement 157 shown in FIG. 13. If the sleeve 330 is not used, the material 324 may be any liquid or liquid/solid mix that will solidify or have sufficient viscosity that it will stay where placed, or reactive materials such as acid-base cement or cross linked polyacrylamide taught with reference to FIGS. 10 and 11 above which may be injected through the port 326 to contact borehole fluids and form an annular isolator. If the rings 328 are used to control positioning of reactive materials, it is preferred that the rings 328 be designed to limit the maximum pressure of such reactive materials.

For many of the above described embodiments it is desirable that the fluid placed in the annulus to form an isolator be very viscous or be able to change properties when exposed to available fluids in the well annulus. Thixotropic materials which are more viscous when stationary than when being pumped may also provide advantages. Various silicone materials are available with these desirable properties. Some are cured by contact with water and become essentially solid. With further reference to FIG. 30, such a condensate curing silicone material may be injected into the annulus without the use of the sleeve 330 and with or without the use of rings 328. Such a curable viscous silicone material will conform to any formation wall contour and will fill micro fractures and porosity some distance into the borehole wall which may cause leakage past other types of isolators. This type of curable silicone material may also provide advantages in the embodiments illustrated in FIGS. 11, 12, 13 and 35. In the FIGS. 12 and 13 embodiments, such a material provides a good material for inflating the sleeves 154 and 158 and any excess fluid vented into the annulus will cure and form a solid isolator.

Figure 31:
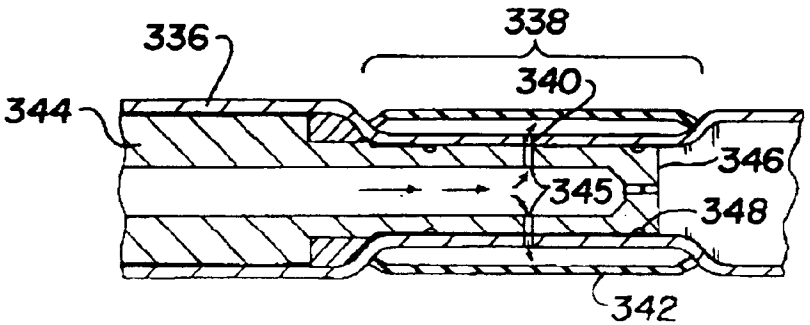
FIG. 31 is a cross-sectional illustration of expandable tubing carrying an inflatable rubber bladder on a recessed portion and an expansion string to fill the rubber bladder with fluid pumped from the surface prior to running of an expansion cone through the reduced diameter portion of the tubing.

With reference now to FIG. 31, another embodiment which allows maximum diameter of the expandable tubing as run is illustrated. A section of expandable tubing 336 has a reduced diameter section 338. Within the reduced diameter section 338 are several ports 340 each preferably including a check valve allowing fluid to flow from inside the tubing 336 to the outside. On the outer surface of the tubing 336 in the reduced diameter section 338 is carried an inflatable bladder 342 sealed at each end to the tubing 336. Bladder 342 is preferably an elastomeric material. Since bladder 342 is carried on the reduced diameter section 338, its uninflated outer diameter is no greater than the outer diameter of tubing 336. An expansion cone tool 344 is shown expanding tubing 336 from left to right. On the expansion tool 344 mandrel 346 are carried external seals 348 sized to produce a fluid tight seal with the inner surface of the reduced diameter section 338 of the tubing 336. The mandrel 346 includes ports 345 from its inner fluid passageway to its outer surface. When the expansion tool 344 reaches the point illustrated in FIG. 31, the seals 348 form a fluid tight seal with the inner surface of reduced diameter tubing section 338. When that happens, pressurized fluid within the expansion tool 344 flows through the side ports 345 on mandrel 346 and the tubing ports 340 to inflate the rubber bladder 342. As expansion of the tubing 336 is continued, the reduced diameter zone 338 is expanded out to full diameter and the now inflated bladder 342 is forced firmly against the borehole wall to form an annular isolator.

In a simpler version of the FIG. 31 embodiment, the expandable bladder 342 may be replaced with one or more solid elastomeric rings. For example two or more of the rings shown in FIG. 2 may be mounted in the recess 338. The benefit of larger unexpanded tubing diameter is achieved by this arrangement. The ports 340 may be eliminated or may be used to inject a fluid, preferably reactive, into the annulus between the rings before or after expansion of tubing 336.

Figure 32:
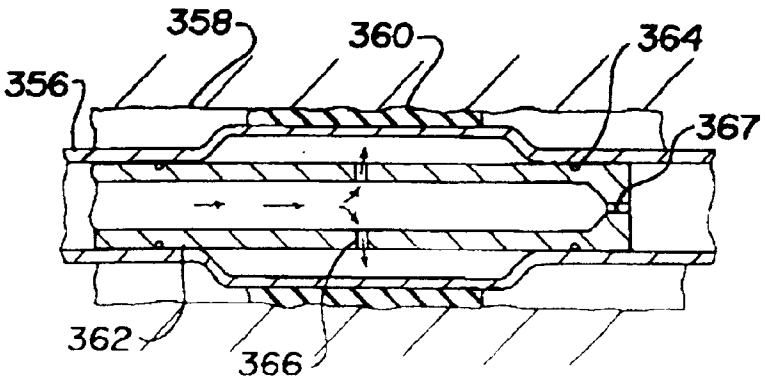
FIG. 32 is a cross-sectional illustration of expandable tubing carrying an elastomeric sleeve and an expansion tool used to expand the tubing into contact with the borehole using pressure fluid pumped from the surface.

With reference to FIG. 32, there is illustrated an embodiment of the present invention which provides for over expansion of an expandable tubing member to form an annular isolator. In FIG. 32, an expandable tubing 356 is shown in place within a borehole 358. The expandable tubing 356 carries an elastomeric sleeve 360 on its outer surface. In place of the sleeve 360, several elastomeric rings such as shown in FIG. 2 may be used if desired. A pressure expansion tool 362 is shown having been run in from the surface location to the location of the sleeve 360. The tool 362 includes seals 364 which form a fluid tight seal with the inner wall of tubing 356. The tool 362 includes side ports 366 located between seals 364. It preferably includes a pressure relief valve 367. After the expansion tool 362 is positioned as shown, fluid is pumped from the surface into the tool 362 at sufficient pressure to expand and overexpand the tubing 356. When the elastomeric sleeve 360 contacts the borehole wall 358 an increase in pressure will be noted and expansion can be stopped. The relief valve limits the pressure to avoid rupturing the tubing 356. The tool 362 may be moved on through the tubing 356 to other locations where external sleeves such as 360 are carried and expand them into contact with the borehole wall 358 to form other annular isolators.

The expansion system shown in FIG. 32 may be used either before or after normal expansion of the tubing 356. If it is performed before normal expansion, the tool 362 may carry an adjustable expansion cone or may pick up a cone from the bottom of the tubing string for expansion as the tool 362 is withdrawn from the tubing 356. If performed after normal expansion of the tubing 356, the seals 364 may be inflatable seals allowing isolation of the zones which need over expansion after the normal expansion process is performed.

Figure 33:
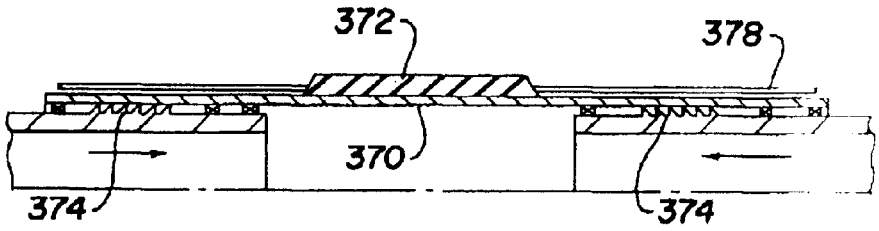
FIGS. 33 and 34 are cross-sectional illustrations of system using an axial load and interior pressure to cause expansion of expandable tubing and an external sleeve into contact with a borehole wall to form an annular isolator.
Figure 34:
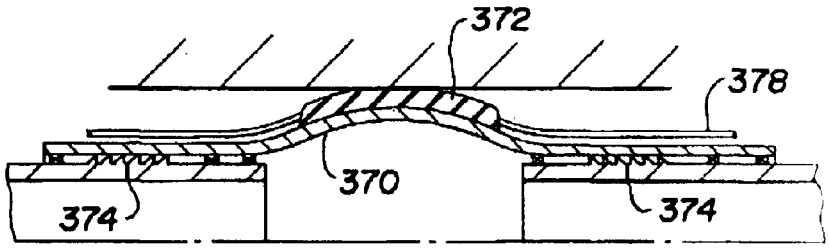

With reference to FIGS. 33 and 34, a system for over expansion of expandable tubing using hydroforming techniques is illustrated. In FIG. 33, a section of expandable tubing 370 carrying an elastomeric sleeve 372 on its outer surface is illustrated. In order to expand the annular barrier area 372, a pair of slips 374 are positioned on the inside of tubing 370 on each side of the barrier 372. Forces are then applied driving the slips towards one another and placing the portion of tubing 370 under the rubber sleeve 372 in compression. The axial compression reduces the internal pressure required to expand tubing 370 and allows it to expand to a larger diameter without rupturing. The pressure within the tubing 370 may be then raised to expand the section which is in axial compression caused by the slips 374. As a result of the axial loading and the internal pressure, the tubing will expand as shown in FIG. 34 until the rubber sleeve 372 contacts the borehole wall 376. This will cause an increase of pressure which indicates that an annular isolator has been formed. The slips 374 may then be released and moved to other locations for expansion to form other annular isolators. If desired, the expansion tool shown in FIG. 32 may be used in conjunction with the slips shown in FIGS. 33 and 34 so that the expansion pressure may be isolated to the annular barrier area of interest. A conduit 378 may be positioned through the rubber sleeve 372 for providing power, control, communications signals, etc. to and from down hole equipment as discussed above with reference to conduit 45 in FIG. 2.

Figure 35:
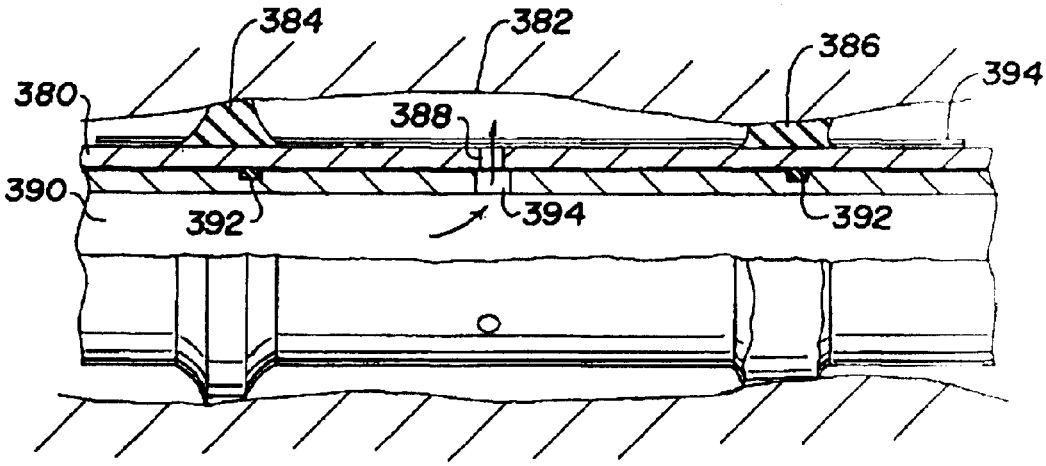
FIG. 35 is a cross-sectional illustration of expanded tubing and an injection tool for placing an annular isolator forming material in the annulus between the expanded tubing and the borehole wall.

With reference to FIG. 35, there is illustrated an embodiment of the present invention which allows formation of a conforming annular isolator after expansion of expandable tubing. In FIG. 35, there is illustrated a section of expandable tubing 380 positioned within an open borehole 382. The tubing 380 carries a pair of elastomeric rings 384 and 386. This is the same arrangement as illustrated in FIG. 2. After expansion of the tubing 380 using a conventional expansion cone, it is seen that the expansion ring 386 has been compressed between the borehole wall 382 and the tubing 380 to form a seal while the expansion ring 384 may not be tightly sealed against the borehole wall since it has been expanded into an enlarged portion of the borehole 382. It is desirable that the rings 384 and 386 be designed to limit the pressure of injected materials. Expanded tubing 380 includes one or more ports 388 which may preferably include check valves. A fluid injection string 390 which may be similar to the device 362 shown in FIG. 32, is shown in place within expanded tubing 380. Injection string 390 includes seals 392 on either side of a port 394 through the injection tool 390. With the injection tool 390 in position as illustrated, various annular isolator forming materials may be pumped from the surface through ports 394 and 388 into the annular space between expanded tubing 380 and the borehole wall 382. The elastomeric rings 384 and 386 tend to keep the injected material from flowing along the annulus. A conduit 394 may be positioned through the rings 384 and 386 for providing power, control, communications signals, etc. to and from down hole equipment as discussed above with reference to conduit 45 in FIG. 2.

In the embodiment of FIG. 35, various materials may be pumped to form the desired annular isolator. Chemical systems of choice would be those which could be injected as a water thin fluid and then attain efficient viscosity to isolate the annulus. Such chemical systems include sodium silicate systems such as those used in the Angard™ and Anjel® services provided by Halliburton Energy Services. Resin systems such as those disclosed in U.S. Pat. No. 5,865,845 (which is hereby incorporated by reference for all purposes) owned by Halliburton and those used in the ResSeal™, Sanfix®, Sanstop™ or Hydrofix™ water shutoff systems provided by Halliburton would also be useful. Crosslinkable polymer systems such as those provided in Halliburton's H2Zero™ and PermSeal™ services would also be suitable. Emulsion polymers such as those provided in Halliburton's Matrol™ service may also create a highly viscous gel in place. Various cements may also be injected into the annulus with this system. The system of FIG. 35 is particularly useful if the surrounding formation has excessive porosity. The injected fluid may be selected to penetrate into the formation away from the borehole wall 382 to prevent fluids from bypassing the annular isolator by flowing through the formation itself.

The petal plate embodiment of FIGS. 28 and 29 may be used in place of the rings 384 and 386 shown in FIG. 35. They may be particularly useful for forming an annular isolator using fine sand as annular isolation material. A premixed slurry of fine sand can be pumped outside tubing 380 between a pair of the petal plate sets 310. The plates 310 should filter out and dehydrate the sand as pressure is increased. It is believed that such a sand pack several feet long would provide a good annular isolator blocking the annular flow of produced fluids. This embodiment may also form a sand annular isolator by catching or filtering out naturally occurring sand which is produced from the formations and flows in the annulus.

Figure 36:
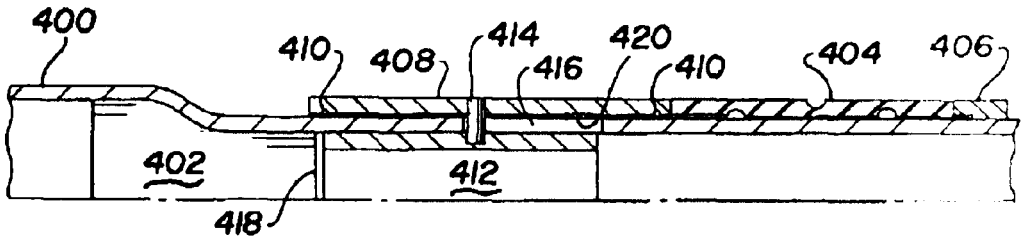
FIG. 36, is a cross sectional illustration of an alternate system for preexpanding an externally carried elastomeric sleeve of the type shown in FIGS. 6 to 9.

With reference to FIG. 36, there is illustrated another system for preexpanding an externally carried elastomeric sleeve of the type shown in FIGS. 6 to 9. A section of expandable tubing 400 is shown being expanded from left to right by an expansion tool 402. A foldable elastomeric sleeve 404, which may be identical to sleeve 80 of FIG. 6, is carried on the outer surface of tubing 400. On the right end of sleeve 404 is a stop ring 406 which may be identical to the ring 82 of FIG. 6. An outer metal sleeve 408 is carried on tubing 400 adjacent the left end of the sleeve 404, and has sliding seals 410 between the inner surface of sleeve 408 and the outer surface of tubing 400. An inner sliding sleeve 412 is positioned at the location of the outer sleeve 408 and connected to it by one or more bolts or pins 414. The pins 414 may slide axially in corresponding slots 416 through the tubing 400.

In operation of the FIG. 36 embodiment, the leading edge 418 of expansion tool 402 is sized to fit within the unexpanded inner diameter of tubing 400 and to push the inner sleeve 412 to the right. As the expansion tool is driven to the right, it pushes the sleeve 412, which in turn pushes outer sleeve 408 to the right by means of the pins 414 which slide to the right in slots 416. When the pins 414 reach the right end of the slots 416, the sleeve 404 will have been folded as illustrated in FIG. 6. Further movement of expansion tool 402 shears off the pins 414 so that the inner sleeve 412 may be pushed on down the tubing 400. As the expansion tool 402 passes through tubing 400, outer sleeve 408 and the sleeve 404, all of these parts are further expanded as illustrated in FIG. 7. The inner surface of sleeve 408 preferably carries a toothed gripping surface 420, like the surface 59 of FIG. 4. When sleeve 408 has moved to the right, gripping surface 420 will be adjacent the outer surface of tubing 400. Upon expansion of the tubing 400, it will grip the toothed surface 420 preventing further sliding of the outer ring 408. The ring 406 may be adapted to slide in response to excessive expansion pressures created by undersized boreholes as discussed above with reference to FIGS. 3 and 4.

Figure 37:
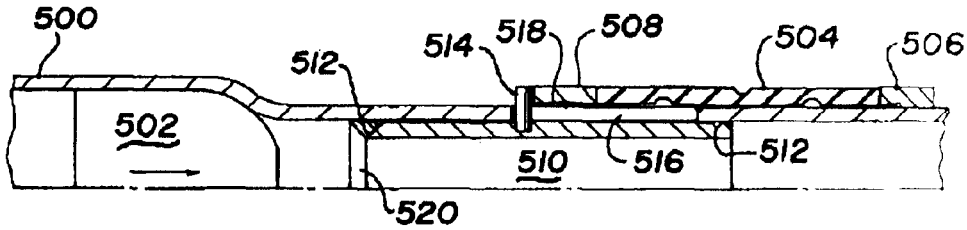
FIG. 37 is a cross sectional illustration of yet another system for preexpanding an externally carried elastomeric sleeve of the type shown in FIGS. 6 to 9.

With reference to FIG. 37, there is illustrated yet another system for preexpanding an externally carried elastomeric sleeve of the type shown in FIGS. 6 to 9. A section of expandable tubing 500 is shown being expanded from left to right by an expansion tool 502. A foldable elastomeric sleeve 504, which may be identical to sleeve 80 of FIG. 6, is carried on the outer surface of tubing 500. On the right end of sleeve 504 is a stop ring 506 which may be identical to the ring 82 of FIG. 6. On the left end of sleeve 504 is attached a slidable ring 508. A sleeve 510 is slidably carried on the inner surface of tubing 500. A pair of sliding seals 512 provide fluid tight seal between sleeve 510 and the inner surface of tubing 500. One or more pins 514 are connected to and extend radially from the inner sleeve 510. The pins 514 extend through corresponding slots 516 in the tubing 500 and are positioned adjacent the left end of the ring 508. The ring 508 preferably carries gripping teeth 518 on its inner surface.

In operation of the FIG. 37 embodiment, the expansion tool 502 is forced from left to right through the tubing 500. When the tool 502 reaches an edge 520 of the inner sleeve 510, it will begin to push the sleeve 510 to the right. The sleeve 510, through pins 514, pushes the outer ring 508 to the right compressing and folding sleeve 504 into the shape shown in FIG. 6. When the pin 514 reaches the end of slot 516, the sleeve 510 stops moving to the right. The edge 520 of inner sleeve 510 is preferably sloped to match the shape of expansion tool 502 and limit the amount of force which can be applied axially before the sleeve 510 stops and is expanded by the tool 502. The tool 502 then passes through sleeve 510 expanding it, the tubing 500, the outer ring 508 and the sleeve 504. As this occurs, the teeth 518 grip the outer surface of tubing 500 to resist further slipping of the ring 508. The ring 506 may be adapted to slide in response to excessive expansion pressures created by undersized boreholes as discussed above with reference to FIGS. 3 and 4.

The embodiments of FIGS. 12 through 16 and 30 (with the inflatable sleeve 330) share several functional features and advantages. These are illustrated in a more generic form in FIGS. 38 through 41. Each of these embodiments provides a recess or compartment in an expandable tubing in which a flowable material used to form an annular isolator is carried with the expandable tubing when it is run into a borehole. In each embodiment it is desirable that sufficient material be carried with the tubing to form an annular isolator in an oversized, washed out and irregular shaped borehole. It is also desirable that the same systems function properly in a nominal or even undersized borehole. In each of these embodiments, an expandable outer sleeve has certain characteristics which make this multifunction capability possible.

Figure 38:
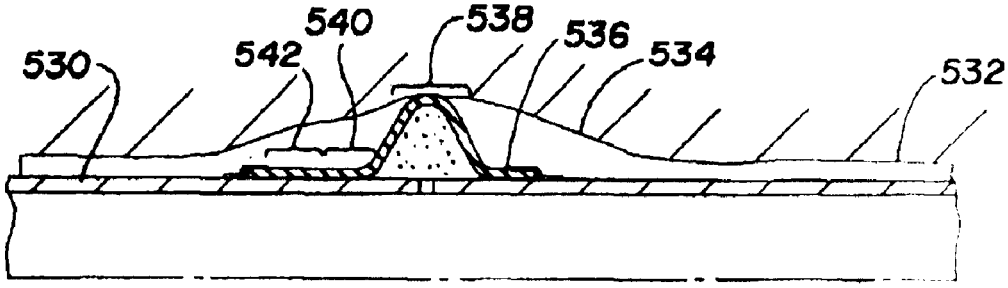
FIGS. 38, 39, 40 and 41 illustrate the deployment of an external sleeve having multiple sections which inflate at different internal pressure levels to form an annular isolator.

In FIG. 38, a section of expanded tubing 530 is shown in an open borehole 532 having an enlarged or washed out portion 534. An inflatable sleeve 536 is shown having a first portion 538 inflated into contact with the enlarged borehole portion 534. The sleeve portion 538 is designed to allow great expansion at a first pressure level to form an annular isolator in an enlarged borehole wall 534. It may be made of elastomeric material or expandable metal which is corrugated or perforated or otherwise treated to allow greater expansion. If sleeve 536 is corrugated or perforated, it is preferably covered with an elastomeric sleeve. Other portions 540, 542 of the sleeve 536 are designed to inflate at pressures higher than the pressure required to inflate the section 538. The volume of fluid carried in the tubing 530 as it is run in or installed in the borehole 532 is selected to be sufficient to inflate sleeve section 538 to its maximum allowable size.

Figure 39:
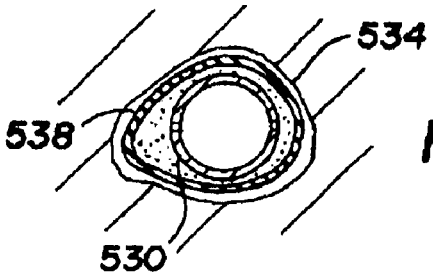

With reference to FIG. 39, an end view of the enlarged borehole section 538, tubing 530 and isolator sleeve section 538 of FIG. 38 is shown. As illustrated, the borehole section 534 may not only be enlarged, but may have an irregular shape, width greater than height and the bottom may be filled with cuttings making it flatter than the top. The flexibility of sleeve section 538 allows it to conform to such irregular shapes. The volume of inflating fluid carried in the tubing 530 should be sufficient to inflate the sleeve 536 into contact with such irregular shaped holes so long as it does not exceed the maximum allowable expansion of the sleeve.

Figure 40:
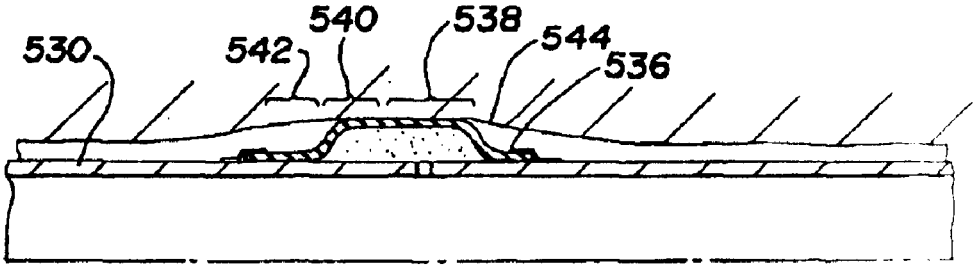

In FIG. 40 is illustrated the same tubing 530 and sleeve 536 is a borehole section 544 which is enlarged, but less enlarged than the washed out section 534 of FIG. 38. In FIG. 40 the sleeve section 538 has expanded into contact with the borehole wall at a smaller diameter than was required in FIG. 38. Only part of the fluid volume carried in the tubing 530 was required to expand sleeve section 538. As the tubing 530 was expanded after the section 538 contacted the borehole wall, the expansion fluid pressure increased to a higher level at which the sleeve section 540 expands. The section 540 has also expanded into contact with the borehole wall 544. In this FIG. 40, the volume of expansion fluid required to expand both sections 538 and 540 into contact with the borehole wall is the same as the amount carried down hole with the tubing 530. Complete expansion of the tubing 530 therefore does not cause further inflation of the sleeve 536.

Figure 41:
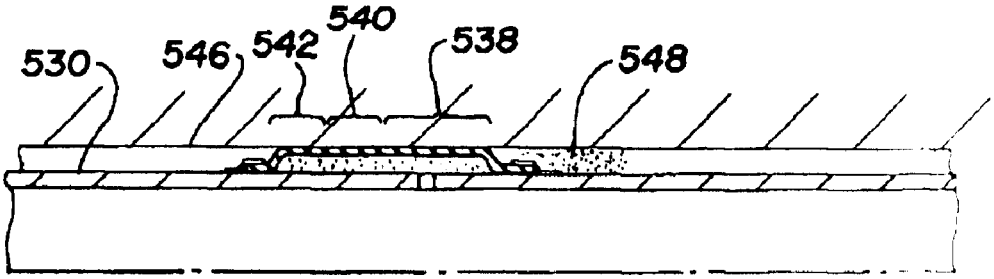

In FIG. 41, the expanded tubing 530 is shown installed in a borehole 546 which is not washed out. Instead the borehole 546 is of nominal drilled diameter or may actually be undersized due to swelling on contact with drilling fluid. In this case, the outer sleeve section 538 first expanded into contact with the borehole at a first pressure level. The expansion fluid pressure then increased causing the sleeve section 540 to expand into contact with the borehole wall 546. Inflation of these sections required only part of the volume of fluid carried in the tubing 530. As a result, the fluid pressure increased to a third level at which sleeve section 542 expanded into contact with the borehole 546. In this illustration, the volume of fluid needed to expand all sections 538, 540 and 542 into contact with the borehole wall was less than the total available amount of fluid carried in tubing 530. As a result, the fluid pressure increased to a fourth level at which a pressure relief valve released excess fluid into the annulus at 548.

An inflatable sleeve as illustrated in FIGS. 38–41 may have two, three or more separate sections which expand at different pressures and may or may not include pressure relief valves. The embodiments of FIGS. 12 and 13 have two sleeve sections which expand at different pressures and a relief valve which opens at a third higher pressure. The embodiment of FIGS. 15 and 16 has three sleeve sections, each of which expands at a different pressure level, and as illustrated does not have a pressure relief valve. The FIG. 15, 16 embodiment may be provided with a pressure relief valve to protect the system from excessive pressure if desired. The combinations of these elements provides for maximum inflation to form an annular isolator in a large irregular borehole, while allowing the same system to be inflated to form an annular isolator in a nominal or undersized borehole without causing excessive pressures or forces which may damage the annular isolator forming sleeve, ring, etc., the tubing or an expansion tool.

Figure 42:
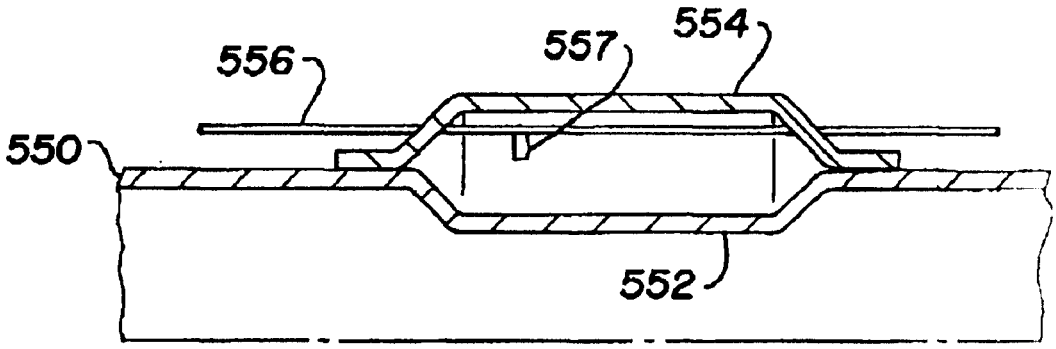
FIG. 42 is a cross sectional illustration of an embodiment having a conduit in the annulus passing through an inflatable isolator.
Figure 43:
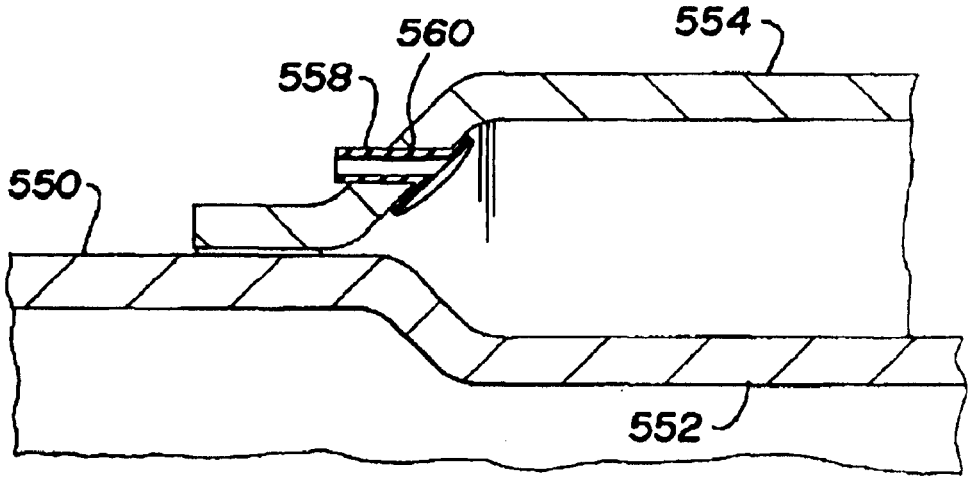
FIG. 43 is a more detailed illustration of a portion of FIG. 42.
Figure 44:
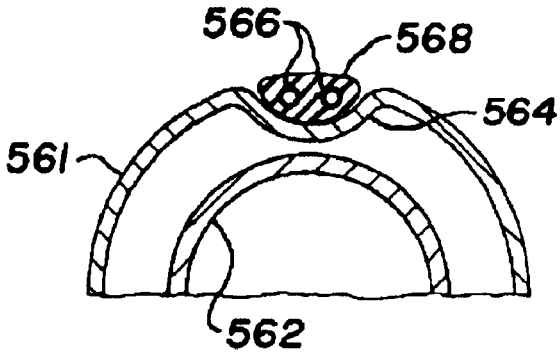
FIG. 44 is an illustration of a pair of conduits located in an annulus and bypassing an inflatable isolator element.

In FIGS. 2, 10, 33, 34 and 35 there are illustrated conduits located in the annulus and passing through the annular isolators formed by those embodiments. With reference to FIGS. 42, 43 and 44 there are illustrated more details of embodiments including such conduits. In FIG. 42, a section of expandable tubing 550 has a reduced diameter section 552. An outer inflatable sleeve 554 extends across the recess 552 to form a compartment for carrying an isolator forming material. An external conduit 556 passes through the sleeve 554. The conduit 556 may have an opening 557 into the compartment between recess 552 and sleeve 554. FIG. 43 provides a more detailed view of a sealing arrangement between the sleeve 554 and the conduit 556 of FIG. 42. A rubber gasket 558 may be positioned in an opening 560 through each end of the sleeve 554 as illustrated. The conduit 556 may be inserted through the gasket 558. The gasket forms a fluid tight seal between the conduit 556 and the sleeve 554 to prevent flow of fluids between the annulus and the compartment between sleeve 554 and the tubing recess 552.

FIG. 44 illustrates another arrangement for providing one or more conduits in the annulus where an annular isolator is positioned. An inflatable sleeve 561 is carried on an expandable tubing 562, forming a compartment in which an annular isolator forming material may be carried down hole with the tubing 562. The sleeve 561 has a longitudinal recess 564 in which is carried two conduits 566. A rubber gasket 568 has external dimensions matching the recess 564 and two holes for carrying the two conduits 566. When the sleeve 561 is expanded into contact with a borehole wall to form an annular isolator, the gasket 568 will act as an annular isolator for that portion of the annulus between the conduits 566 and the sleeve 561 and will protect the conduits 566.

As discussed above, conduits 556 and 566 may carry various copper or other conductors or fiber optics or may carry hydraulic fluid or other materials. In the FIG. 42 embodiment, the side port 557 may be used to carry fluid for inflating the sleeve 554 if desired. The conduit may pass through a series of sleeves 554 and they may all be inflated to the same pressure with a single conduit 556 having side ports 557 in each sleeve. The conduit 556 may be used to deliver one part of a two part chemical system with the other part carried down hole with the tubing. The conduit 556 may be used to couple electrical power to heaters to activate chemical reactions. Either electrical power or hydraulic fluid may be used to open and close valves which may control inflation of annular isolators during installation of a production string, or may be used during production to control flow of produced fluids in each of the isolated producing sections. The dual conduit arrangement of FIG. 44 may provide two hydraulic lines which can be used to control and power a plurality of down hole control systems.

Figure 45:
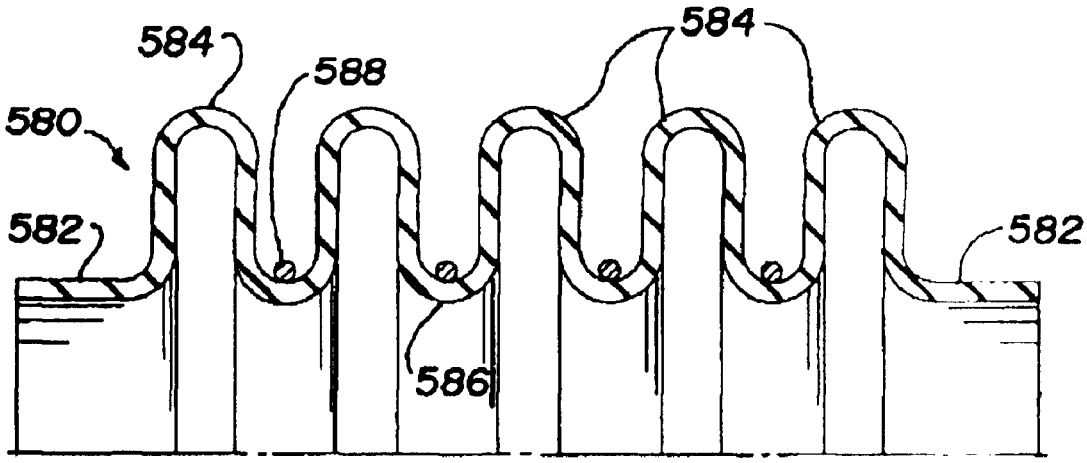
FIG. 45 is an illustration of a circumferentially corrugated elastomeric sleeve which may be used to form an annular isolator.

With reference to FIG. 45, there is illustrated an elastomeric sleeve 580 which may be used as an alternative to sleeve 56 of FIG. 3, sleeves 80 and 88 of FIG. 6, or the sleeve 220 of FIG. 21. The sleeve 580 is illustrated in an unrestrained or as-molded shape. Each end 582 is a simple cylindrical elastomeric sleeve. Between the ends 582 are a series of circumferential corrugations 584. The corrugations 584 have inner curved portions 586 having an inner diameter corresponding to the inner diameter of end portions 582. This inner diameter is sized to fit on the outer surface of an unexpanded expandable tubing section. The maximum diameter of corrugations 584 is sized to contact or come close to the wall of a washed out borehole section without tubing expansion. If desired, wire bands 588 may be used to to maintain the corrugated shape when the sleeve 580 is compressed as discussed below.

In use, the sleeve 580 is attached to expandable tubing with a sliding ring like ring 60 and a fixed ring like ring 58 of FIG. 3. The sleeve 580 is then stretched axially until the corrugations are substantially flattened against the tubing and the sliding ring is latched into a restraining recess. Note that axial stretching of the elastomer is not essential to flattening the corrugations. The flattened sleeve 580 is then carried with the tubing as it is installed in a borehole. Upon expansion of the tubing in the borehole, the sliding ring will be released as shown in FIG. 4 and will tend to return to its corrugated shape. As expansion continues the sliding ring will be pushed by the expansion cone as shown in FIGS. 6 and 7 to axially compress the sleeve 580. The sleeve 580 will take the form shown in FIG. 45 and then be further compressed until the corrugations 584 are tightly pressed together. The wire bands 588 are preferred to maintain the shape after full compression. The alternative axial compression and radial expansion systems shown in FIGS. 36 and 37 may be used with the sleeve 580 if desired. It can be seen that by molding the sleeve 580 in the form shown in FIG. 45, the sleeve will have a small radial height as run into the borehole and a very predictable radial height after it has been released and returned to its corrugated shape. As with other embodiments described herein, the sleeve 580 will then be further expanded with the expandable tubing as the expanding tool passes under the sleeve 580.

As noted above in the descriptions of various embodiments, various fluids may be used in the present invention to inflate an external sleeve, bladder, etc. to form an annular isolator or may be injected directly into the annulus between tubing and a borehole wall to form an annular isolator by itself or in combination with external elastomeric rings, sleeves, etc. carried on the tubing. These fluids may include a variety of single parts liquids which are viscous or thixotropic as carried down hole in the tubing. They may include chemical systems which react with ambient fluids to become viscous, semisolid or solid. They may also include flowable solid materials such as glass beads. In many of the above described embodiments an annular isolator is formed of a viscous or semisolid material either directly in contact with a borehole wall or used as a fluid to inflate a metallic and/or elastomeric sleeve. These arrangements not only provide annular isolation in an irregular or enlarged borehole wall, but also allow the isolation to be maintained as the shape or size of the borehole changes which often occurs during the production lifetime of a well.

As is apparent from the above described embodiments, it is desirable to provide external elastomeric sleeves, rings, etc. which are of minimal diameter during running in of tubing, but which expand sufficiently to form an annular isolator in irregular and enlarged open borehole. By proper selection of elastomeric materials, it can swell upon contact with well bore fluids or setting fluids carried in or injected into production tubing. For example, low acrylic-nitrile swells by as much as fifty percent when contacted by xylene. Simple EPDM compounds swell when contacted by hydrocarbons. This approach may provide additional expansion and isolation in the embodiments shown in FIGS. 2, 4, 5, 6, 12, 15, 19, 22, 25, 30, 31, 32, 34 and 35. It may be desirable to encase the swellable elastomer inside a nonswellable elastomer. Elastomers which have been expanded by this method may lose some physical strength. A nonswellable outer layer would also prevent loss of the swelling agent and shrinkage of the swellable material. For example in the embodiment of FIG. 30, the elastomeric sleeve 330 can be made of two layers, with the inner layer swellable and the outer layer not swellable. The fluid 324 can be selected to cause the inner layer to swell. The fluid 324 and inner layer of elastomer would tend to fill the expanded member 330 with a solid or semisolid mass.

It is often desirable for the inflating fluids described herein to be of low viscosity while being used to inflate a sleeve or being pumped directly into an annulus. Low viscosity fluids allow some of the fluid to flow into microfractures or into the formation to help stop fluids from bypassing the annular isolator. But it is also desirable to have the injected fluids become very viscous, semisolid or solid once in place. Many two part chemical systems are available for creating such viscous, semisolid, rubbery or solid materials. Some, for example the silicone materials or the polyacrylamide materials, react with available water to form a thick fluid. Others require a two part chemical system or a catalyst to cause the chemicals to react. The FIG. 10 embodiment delivers two chemical components in dry condition to be reacted together with ambient water. The FIG. 24 embodiment delivers and mixes a two part chemical system to the location where an annular isolator is needed. In the embodiment of FIGS. 13 and 14, the corrugated tubing section 160 provides four separate compartments in which various chemical systems may be carried with the tubing as installed to be mixed upon expansion of the tubing. In other embodiments, such as those shown in FIGS. 12 through 16, the delivery system includes a single recess or compartment. In these embodiments, a two part chemical system can be used by encapsulating one part of the chemical system, or a catalyst, in bags, tubes, microspheres, microcapsules, etc. carried in the other part of the chemical system. By selecting the sizes and shapes of such containers, they will rupture during the expansion process allowing the materials to mix and react. For example, in the FIG. 30 embodiment, the port 326 can be shaped to cause rupturing of such bags, tubes, microcapsules, etc. and mixing of the materials as they pass through the port.

As noted above, any one of the annular isolators 28, 30, 36, 38 shown in FIG. 1, may actually comprise two or more of the individual isolators illustrated in other figures. If desired, pairs of such individual isolators may be arranged closely to provide separate recesses or storage compartments for carrying each part of a two part chemical system in the tubing, to be mixed only after tubing expansion. For example, an embodiment according to FIG. 12 or 13 could be spaced a short distance up hole from an embodiment like FIG. 11. The FIG. 11 embodiment could carry a catalyst for the material carried in the FIG. 12 or 13 embodiment. Excess fluid vented through the pressure relief mechanism of the FIG. 12 or 13 embodiment would be vented down hole toward the FIG. 11 embodiment, which upon expansion would release the catalyst into the borehole causing the vented fluid to become viscous, semisolid or solid. In similar fashion, the FIG. 30 embodiment could include two internal sleeves 322 each carrying one part of a two part chemical system and each having a port 326 located between the pair of elastomeric rings 328. Upon expansion, both parts of the chemical system would be injected into the annulus and isolated between rings 328 to mix and react. Alternatively, any one of the described individual isolators may include one of the one-component chemicals or swellables to be ejected from the relief system and form an annular isolator on contact or reaction with the ambient fluids in the annulus. Under either of these approaches, both a mechanical isolator or isolators (e.g. the inflatable member(s)) and a chemical or swellable isolator (formed as a result of the materials ejected through the relief systems into the annulus) are formed in proximity to each other in the same annulus.

In the embodiments illustrated in FIGS. 11–16, 24, 25, 30, and 38–41, an annular isolator forming material is preferably carried down hole in a reservoir or compartment formed in part by a tubing wall. In FIGS. 11–16 the inflation fluid compartment is formed between a reduced diameter portion of the tubing and an outer sleeve. In FIG. 30, a compartment is formed between an inner sleeve and the inside surface of a tubing. In either case, the material is carried down hole with the tubing as it is run in or installed in the borehole. It is preferred that the compartment be entirely, or at least in part, located within the outer diameter of the tubing as it is run in the borehole. This allows a sufficient volume of material to inflate a sleeve or bladder, or to form an annular isolator in the annulus, to be carried down hole, but does not require, or minimizes, reduction in the tubing diameter to provide an overall system diameter small enough to be installed in the borehole. It is desirable for the tubing to have the largest possible diameter as installed, so that upon expansion it can reduce the annulus size as much as possible.

Many of the above-described embodiments include the use of an expansion cone type of device for expansion of the tubing. However, one of skill in the art will recognize that many of the same advantages may be gained by using other types of expansion tools such as fluid powered expandable bladders or packers. It may also be desirable to use an expandable bladder in addition to a cone type expansion tool. For example, if a good annular isolator is not achieved after expansion with a cone type tool, an expandable bladder may be used to further expand the isolator to achieve sealing contact with a borehole wall. An expandable bladder may also be used for pressure or leak testing an installed tubing string. For example, an expandable bladder may be expanded inside the tubing at the location where an annular isolator has been installed according to one of the embodiments disclosed herein. The tubing may be pressured up to block flow in the tubing itself to allow detection of annular flow past the installed isolator. If excessive leakage is detected, the bladder pressure may be increased to further expand the isolator to better seal against the borehole wall.

In many of the above described embodiments the system is illustrated using an expansion tool which travels down hole as it expands expandable tubing and deploys an annular isolator. Each of these systems may operate equally well with an expansion tool which travels up hole during the tubing expansion process. In some embodiments, the locations of various ports and relief valves may be changed if the direction of travel of the expansion tool is changed. For horizontal boreholes, the term up hole means in the direction of the surface location of a well.

Similarly, while many of the specific preferred embodiments herein have been described with reference to use in open boreholes, similar advantages may be obtained by using the methods and structures described herein to form annular isolators between tubing and casing in cased boreholes. Many of the same methods and approaches may also be used to advantage with production tubing which is not expanded after installation in a borehole, especially in cased wells.

While the present invention has been illustrated and described with reference to particular apparatus and methods of use, it is apparent that various changes can be made thereto within the scope of the present invention as defined by the appended claims.

What we claim as our invention is:

1. A system for forming an annular isolator between expandable tubing and a borehole comprising:

a section of expandable tubing, a compartment formed in said expandable tubing, an annular isolator forming material carried in said compartment, an inflatable sleeve carried on the outer surface of said expandable tubing, and a flow path from said compartment to said inflatable sleeve, said inflatable sleeve having a first section configured to be inflated at a first pressure and a second section configured to be inflated at a second pressure greater than said first pressure.

2. A system according to claim 1, wherein:

said borehole has a maximum expected diameter, said sleeve first section is inflatable to said maximum expected diameter without damage to said sleeve, and said compartment is sized to carry sufficient isolator forming material to inflate said sleeve first section to said maximum expected diameter.

3. A system according to claim 1, wherein said sleeve has a third section inflatable at a third pressure greater than said second pressure.

4. A system according to claim 1, wherein said inflatable sleeve first section comprises an axially corrugated metal.

5. A system according to claim 1, wherein said inflatable sleeve comprises an elastomeric sleeve.

6. A system according to claim 5, wherein said inflatable sleeve comprises an expandable metal sleeve surrounding said elastomeric sleeve in said second section.

7. A system according to claim 6, wherein said expandable metal sleeve is perforated.

8. A system according to claim 1, wherein said inflatable sleeve together with the outer surface of said expandable tubing form said compartment.

9. A system according to claim 8, wherein:

a portion of said expandable tubing has a reduced diameter, and said inflatable sleeve extends across said reduced diameter portion.

10. A system according to claim 8, wherein:

a portion of said expandable tubing is corrugated axially, and said inflatable sleeve extends across said corrugated portion.

11. A system according to claim 1, wherein said inflatable sleeve comprises expandable metal.

12. A system according to claim 1, wherein said inflatable sleeve comprises an elastomer.

13. A system according to claim 1, wherein said inflatable sleeve comprises expandable metal and an elastomer.

14. A system according to claim 1, further comprising an expansion device for expanding said expandable tubing and driving said material from said compartment into said inflatable sleeve.

15. A system according to claim 5, wherein the elastomeric sleeve comprises a material which swells upon contact with fluid in a borehole.

16. A system according to claim 15, wherein the material comprises low acrylic-nitrile.

17. A system according to claim 15, wherein the material comprises an EPDM compound.

18. A system according to claim 12, wherein the elastomer comprises a material which swells upon contact with fluid in a borehole.

19. A system according to claim 13, wherein the elastomer comprises a material which swells upon contact with fluid in a borehole.

20. A system for forming an annular isolator between expandable tubing and a borehole comprising:

a section of expandable tubing, a compartment formed in said expandable tubing, an annular isolator forming material carried in said compartment, an inflatable member carried an the outer surface of said expandable tubing, a flow path from said compartment to said inflatable member, and a pressure relief valve coupled to said inflatable member adapted to release material from said inflatable member at a selected pressure level.

21. A system for forming an annular isolator between expandable tubing and a borehole comprising:

a section of expandable tubing, a compartment formed in said expandable tubing, an annular isolator forming material carried in said compartment, a flow path from said compartment to the outer surface of said tubing, and an expansion device for expanding said tubing and driving said material from said compartment through said flow path and outside said tubing, whereby upon expansion of said tubing in a borehole said material flows into an annulus between said tubing and said borehole and forms an annular isolator.

22. A system according to claim 21, wherein said annular isolator forming material is chemically reactive with fluids in said borehole.

23. A system according to claim 21, wherein said annular isolator forming material is a multipart chemical system which reacts after said material is driven through said flow path.

24. A system according to claim 21, wherein said annular isolator forming material is a material which absorbs water and swells.

25. A system according to claim 24, wherein said annular isolator forming material is a polymer.

26. A system for forming an annular isolator between expandable tubing and a borehole comprising:

a section of expandable tubing, a sleeve carried within said tubing and forming a compartment between said sleeve and an inner surface of said tubing, an annular isolator forming material carried in said compartment, and a port from the inner surface to the outer surface of said tubing.

27. A method for forming an annular isolator between tubing and a borehole comprising:

forming a compartment in a section of expandable tubing, attaching an inflatable sleeve to the outer surface of the tubing, the sleeve having a first section inflatable at a first pressure and a second section inflatable at a second pressure greater than the first pressure, filling the compartment with an isolator forming material, installing the tubing in a borehole, and driving the isolator forming material from said compartment to the inflatable sleeve; and inflating said first section with the first pressure and said second section with the second pressure.

28. A method according to claim 27, wherein said step of driving said isolator forming material from said compartment comprises expanding said tubing.

29. A method according to claim 27, wherein said step of driving said isolator forming material from said compartment comprises driving a cone type expansion tool through said tubing.

30. A method according to claim 27, wherein said step of forming a compartment comprises attaching an inflatable sleeve to the outer surface of said tubing.

31. A method according to claim 30, wherein the inflatable sleeve comprises an elastomer, further comprising swelling the elastomer in the borehole.

32. A method according to claim 31, further comprising swelling the elastomer by exposing the elastomer to fluid in the borehole.

33. A method for forming an annular isolator between tubing and a borehole, comprising:

attaching an inflatable element to the outer surface of expandable tubing, installing the tubing in a borehole, inflating the inflatable element, and after inflating the inflatable element, expanding the tubing.

34. A method according to claim 33, further comprising:

forming a compartment in said tubing, filling said compartment with an annular isolator forming material, and inflating the inflatable element with said annular isolator forming material.

35. A method according to claim 34, wherein said step of expanding said tubing comprises forcing an expansion cone through said tubing.

36. A method according to claim 35, wherein said step of inflating said inflatable element comprises collapsing said compartment.

37. A method according to claim 36, wherein said step of collapsing said compartment comprises forcing an expansion cone through said tubing.

38. A method according to claim 33, further comprising pumping an annular isolator barrier forming material down said tubing and into said inflatable member.

39. A method according to claim 38, further comprising pumping an annular isolator barrier forming material through a work string in said tubing.

40. A method according to claim 39, wherein:

said work string comprises a tubing expansion tool, and said step of pumping an annular isolator barrier forming material through a work string occurs while expanding said tubing.

41. A method according to claim 33, wherein the inflatable element comprises an elastomeric material which swells upon contact with fluid in the borehole, further comprising swelling the elastomeric material in the borehole.

42. A method according to claim 41, further comprising swelling the elastomeric material by exposing the elastomeric material to fluid in the borehole.

43. A system for forming an annular isolator between expandable tubing and a borehole comprising:

a section of expandable tubing, a compartment formed in said expandable tubing, an annular isolator forming material carried in said compartment, and a pressure relief valve coupled to said compartment adapted to release material from said compartment to an outer surface of the expandable tubing at a selected pressure level.

44. A method for forming an annular isolator between tubing and a borehole comprising:

forming a compartment in a section of expandable tubing, attaching an inflatable sleeve to the outer surface of the tubing, the sleeve inflatable at a first pressure and having a relief valve which opens at a second pressure greater than said first pressure, filling the compartment with an isolator forming material, installing the tubing in a borehole, driving the isolator forming material from the compartment to the inflatable sleeve at a pressure less than said second pressure, and driving the isolator forming material from the compartment to the inflatable sleeve at a pressure greater than said second pressure.

45. A method according to claim 44, wherein the inflatable sleeve comprises an elastomer, further comprising swelling the elastomer in the borehole.

46. A method according to claim 45, further comprising swelling the elastomer by exposing the elastomer to fluid in the borehole.

47. A method for forming an annular isolator between expandable tubing and a borehole comprising:

attaching a sleeve to an inner surface of expandable tubing and forming a compartment between said sleeve and an inner surface of said expandable tubing, filing the compartment with an annular isolator forming material, forming a port from the compartment to the outer surface of said expandable tubing, and driving the annular isolator forming material from the compartment through the port.

* * * * *

UNITED STATES PATENT AND TRADEMARK OFFICE

CERTIFICATE OF CORRECTION

PATENT NO. : RE 41,118 E
APPLICATION NO. : 11/928732
DATED : February 16, 2010
INVENTOR(S) : Michael M. Brezinski et al.

It is certified that error appears in the above-identified patent and that said Letters Patent is hereby corrected as shown below:

Title Page, Item (56) (Other Publications), Line 2: Delete "Treatment," and insert -- Treatments, --, therefor.

Title Page, Item (56) (Other Publications), Line 5: Before "May" insert -- Field Bulletin. --.

Column 34, Line 43: In Claim 47, Delete "filing" and insert --filling--, therefor.

Signed and Sealed this

Thirteenth Day of July, 2010

David J. Kappos

David J. Kappos
*Director of the United States Patent and Trademark Office*